(12) United States Patent
Maeshiba et al.

(10) Patent No.: US 11,579,833 B2
(45) Date of Patent: Feb. 14, 2023

(54) DISPLAY APPARATUS AND SIGNAL GENERATION APPARATUS

(71) Applicant: Sony Corporation, Tokyo (JP)

(72) Inventors: Hiroaki Maeshiba, Tokyo (JP); Daisuke Yamaoka, Kanagawa (JP)

(73) Assignee: Sony Corporation

( * ) Notice: Subject to any disclaimer, the term of this patent is extended or adjusted under 35 U.S.C. 154(b) by 196 days.

(21) Appl. No.: 16/954,770

(22) PCT Filed: Nov. 29, 2018

(86) PCT No.: PCT/JP2018/044035
§ 371 (c)(1),
(2) Date: Jun. 17, 2020

(87) PCT Pub. No.: WO2019/130972
PCT Pub. Date: Jul. 4, 2019

(65) Prior Publication Data
US 2021/0089257 A1  Mar. 25, 2021

(30) Foreign Application Priority Data

Dec. 28, 2017 (JP) .............................. JP2017-254119
Sep. 18, 2018 (JP) .............................. JP2018-174059

(51) Int. Cl.
*G06F 3/16* (2006.01)
*G06F 1/16* (2006.01)
(Continued)

(52) U.S. Cl.
CPC .............. *G06F 3/16* (2013.01); *G06F 1/1605* (2013.01); *G10K 9/12* (2013.01); *H04S 3/002* (2013.01); *H04S 2400/13* (2013.01)

(58) Field of Classification Search
None
See application file for complete search history.

(56) References Cited

U.S. PATENT DOCUMENTS 5,530,760 A * 6/1996 Paisley ..................... H04S 3/02
 381/27
5,930,376 A * 7/1999 Markow ............... G06F 1/1616
 381/337

(Continued)

FOREIGN PATENT DOCUMENTS

| CN | 1812662 A | 8/2006 |
|---|---|---|
| CN | 1980491 A | 6/2007 |

(Continued)

OTHER PUBLICATIONS

Anonymous: "Tech Note: Understanding Exciters—Principles and Applications", Apr. 18, 2014 (Apr. 18, 2014), pp. 1-8, XP055273098, Retrieved from the Internet: URL:http://www.daytonaudio.com/media/resources/understanding-and-using-dayton-audio-exciters.pdf [retrieved on May 17, 2016].

(Continued)

*Primary Examiner* — Walter F Briney, III
(74) *Attorney, Agent, or Firm* — Lerner, David, Littenberg, Krumholz & Mentlik, LLP

(57) ABSTRACT

A display apparatus according to an embodiment of the present disclosure includes: a thin plate-like display cell that displays an image; M exciters that are disposed on a back surface side of the display cell, and vibrate the display cell; and a driving section that drives the display cell and the M exciters.

13 Claims, 19 Drawing Sheets

(51) Int. Cl.
G10K 9/12 (2006.01)
H04S 3/00 (2006.01)

(56) References Cited

U.S. PATENT DOCUMENTS

| | | | |
|---|---|---|---|
| 2003/0219137 A1* | 11/2003 | Fincham | H04R 5/02 |
| | | | 381/86 |
| 2007/0036388 A1 | 2/2007 | Lee et al. | |
| 2007/0165886 A1 | 7/2007 | Topliss et al. | |
| 2009/0041265 A1* | 2/2009 | Kubo | H04R 3/04 |
| | | | 381/98 |
| 2012/0243719 A1* | 9/2012 | Franklin | G06F 1/1688 |
| | | | 381/333 |
| 2015/0138157 A1 | 5/2015 | Harris et al. | |
| 2016/0192047 A1 | 6/2016 | Chang | |
| 2017/0280243 A1 | 9/2017 | Choi et al. | |

FOREIGN PATENT DOCUMENTS

| | | |
|---|---|---|
| CN | 101026344 A | 8/2007 |
| CN | 104252287 A | 12/2014 |
| CN | 104469567 A | 3/2015 |
| CN | 105191349 A | 12/2015 |
| CN | 106663395 A | 5/2017 |
| EP | 2164279 A1 | 3/2010 |
| JP | 2000092578 A | 3/2000 |
| JP | 2002510182 A | 4/2002 |
| JP | 2007104602 A | 4/2007 |
| JP | 2007143010 A | 6/2007 |
| JP | 2007515873 A | 6/2007 |
| JP | 2009159104 A | 7/2009 |

OTHER PUBLICATIONS

International Search Report for Application No. PCT/JP2018/044035 dated Feb. 12, 2019, 2 pages.

* cited by examiner

[ FIG. 1 ]
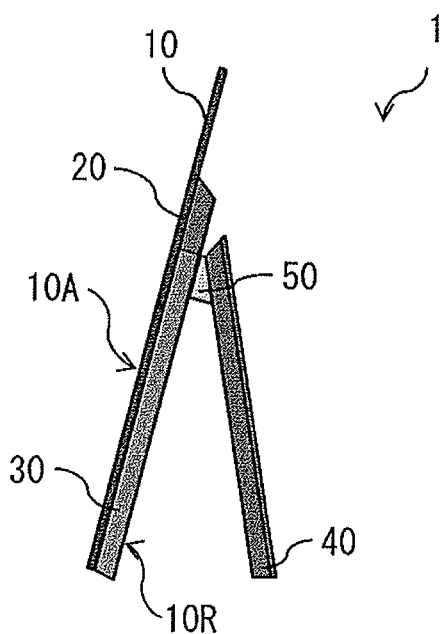
[ FIG. 2 ]
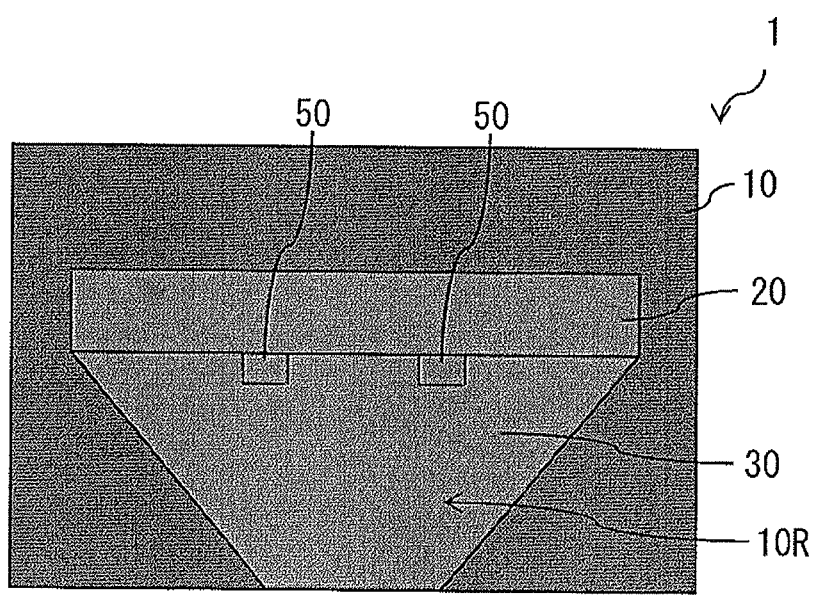

[ FIG. 3 ]
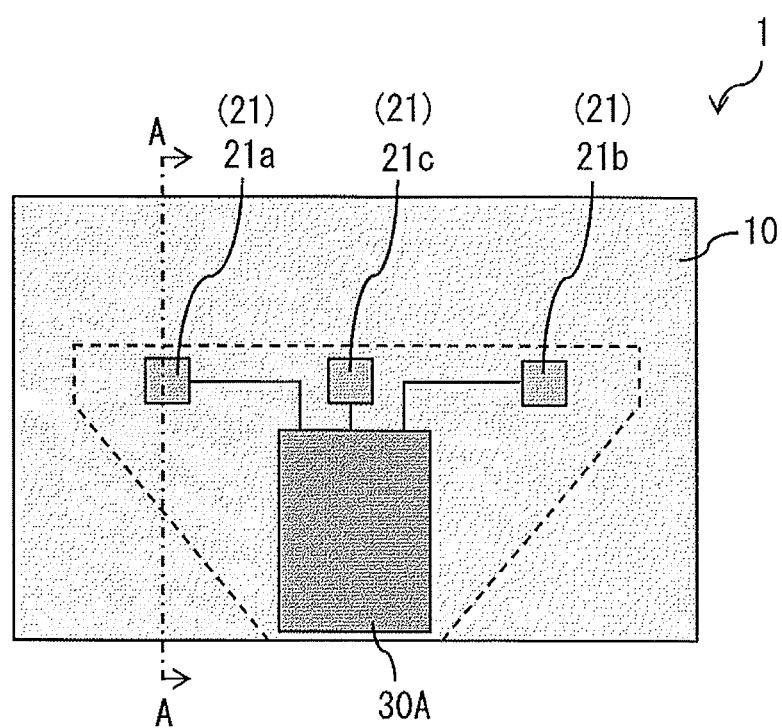

[ FIG. 4 ]
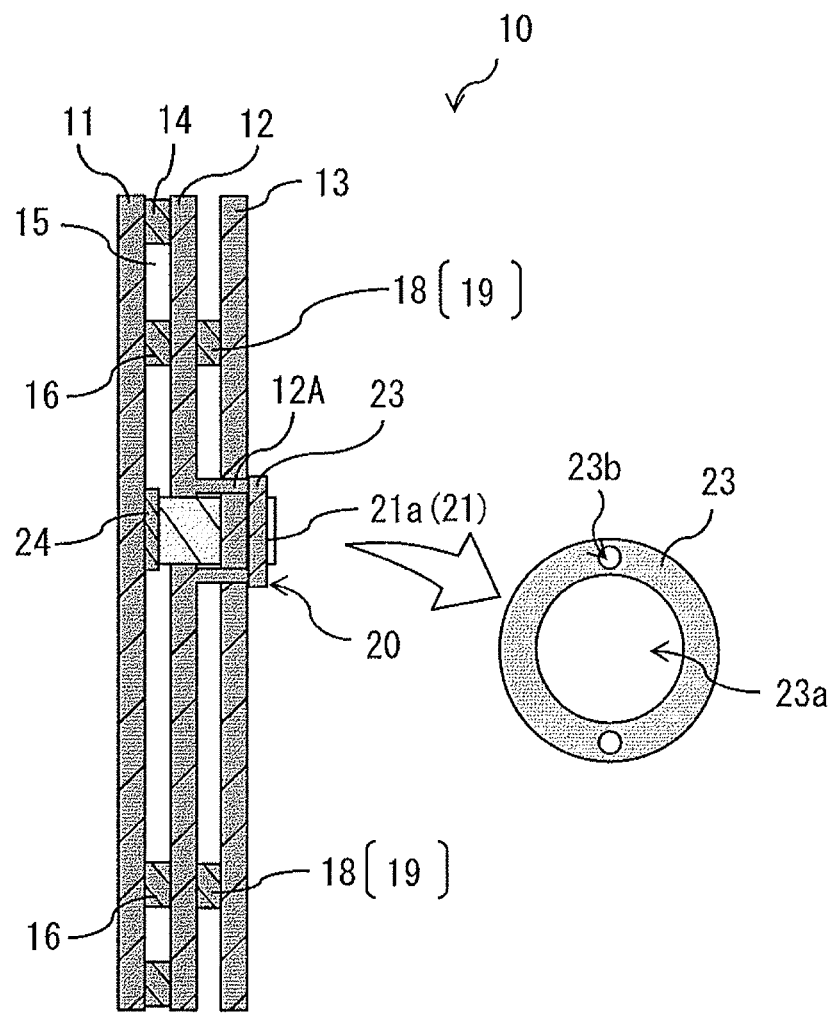
[ FIG. 5 ]
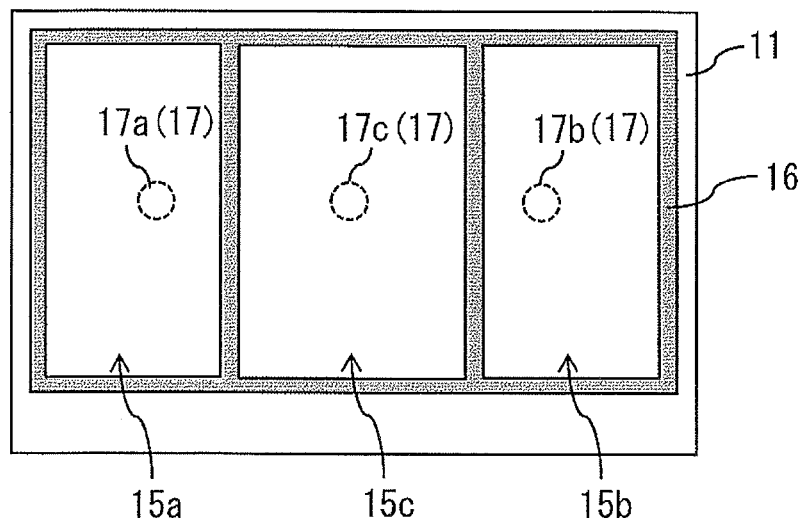

[ FIG. 6 ]
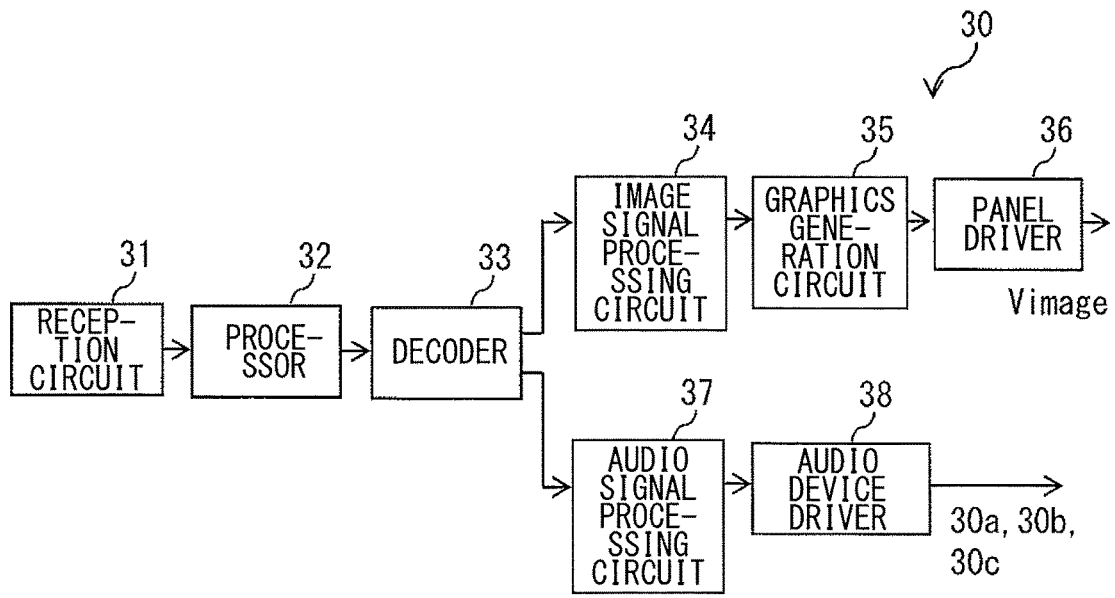
[ FIG. 7 ]
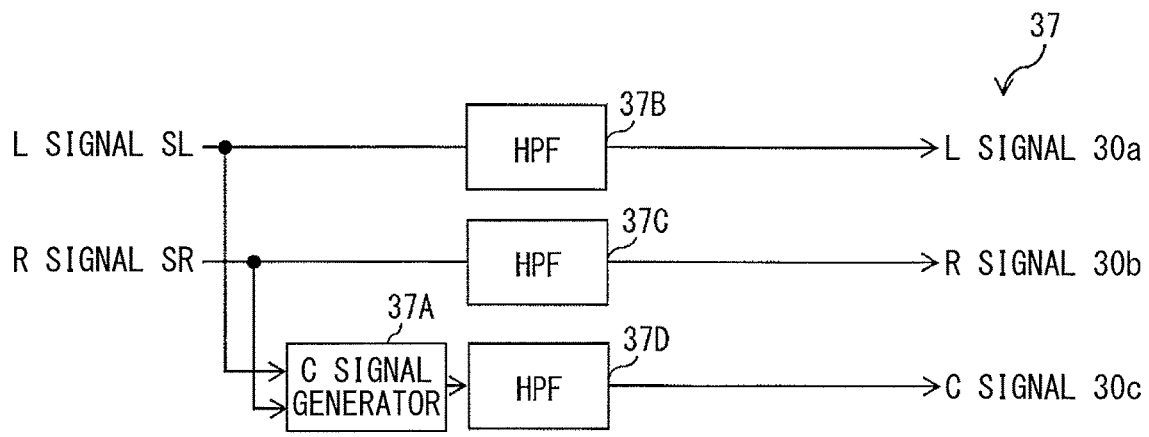

[ FIG. 8 ]
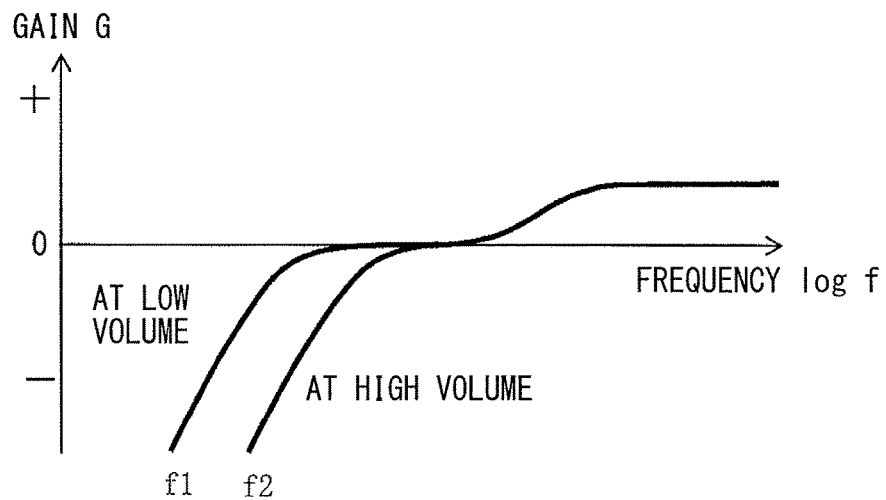
[ FIG. 9 ]
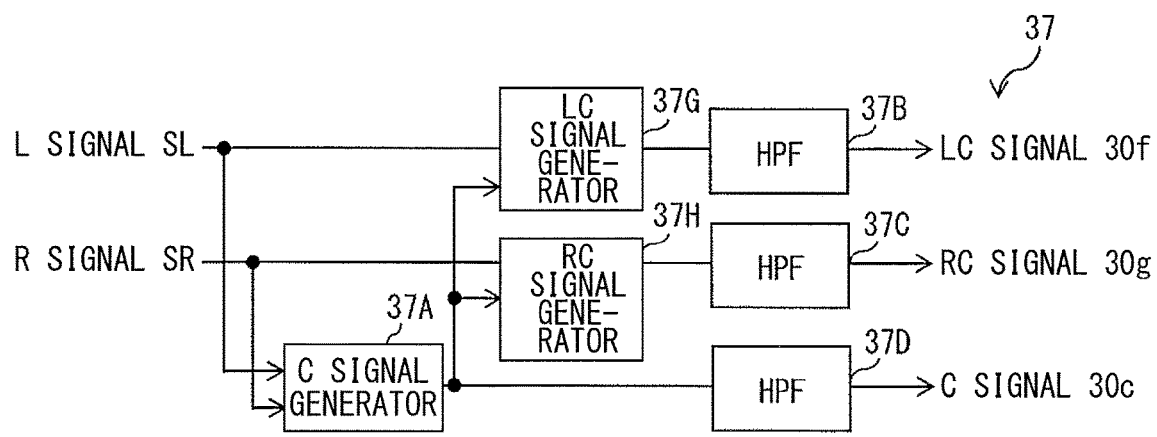

[ FIG. 10 ]
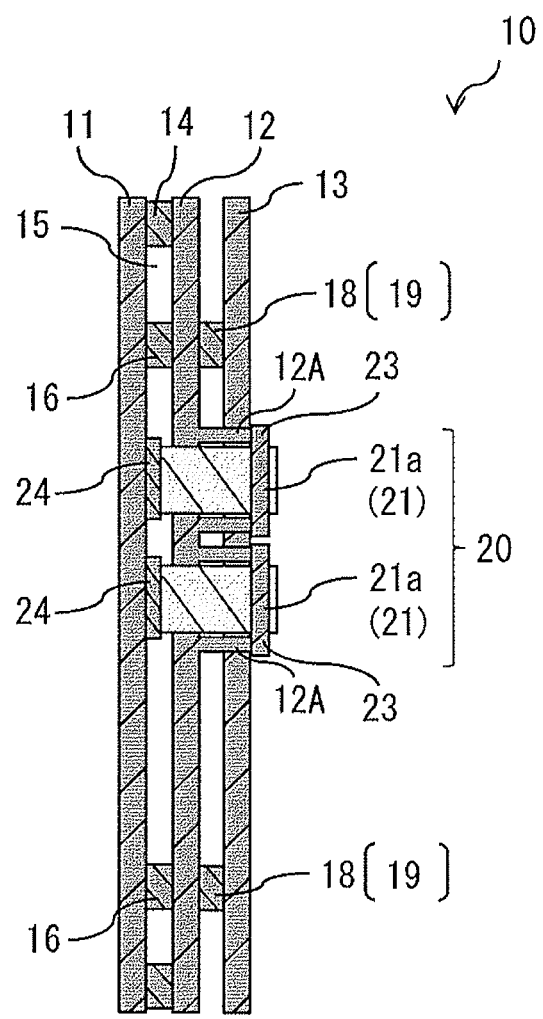

[ FIG. 11 ]
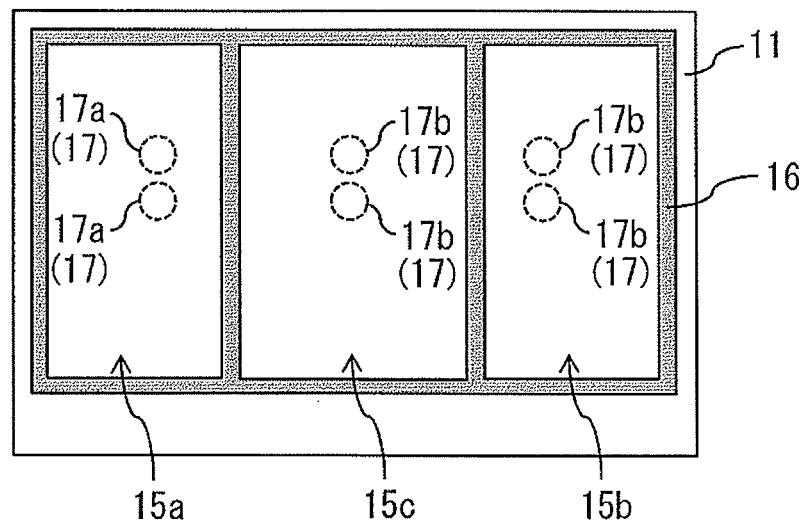
[ FIG. 12 ]
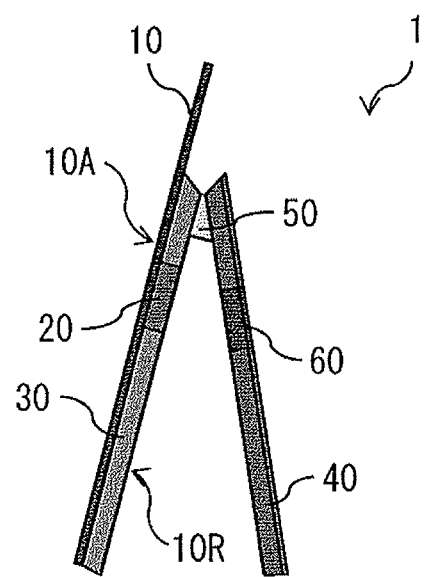

[ FIG. 13 ]
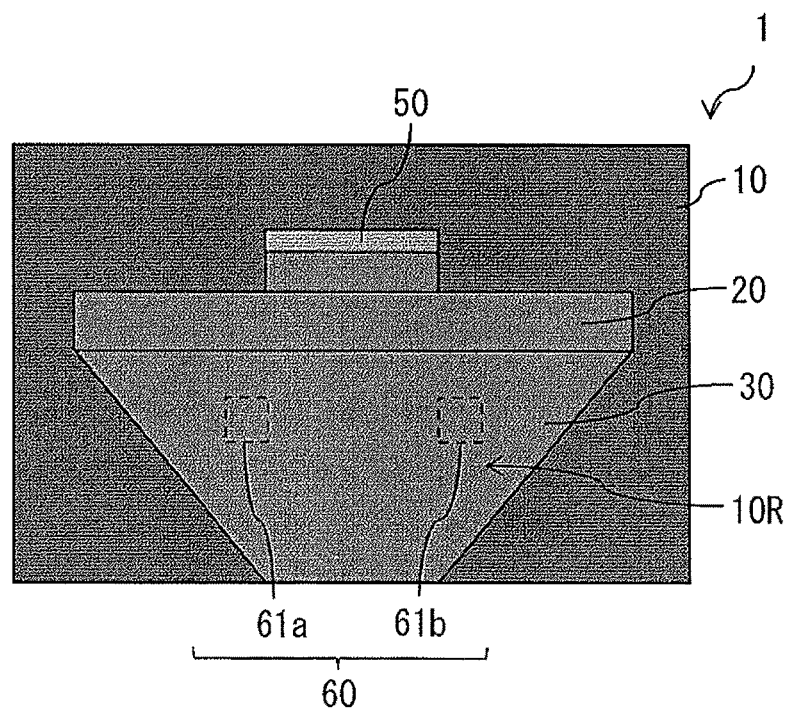
[ FIG. 14 ]
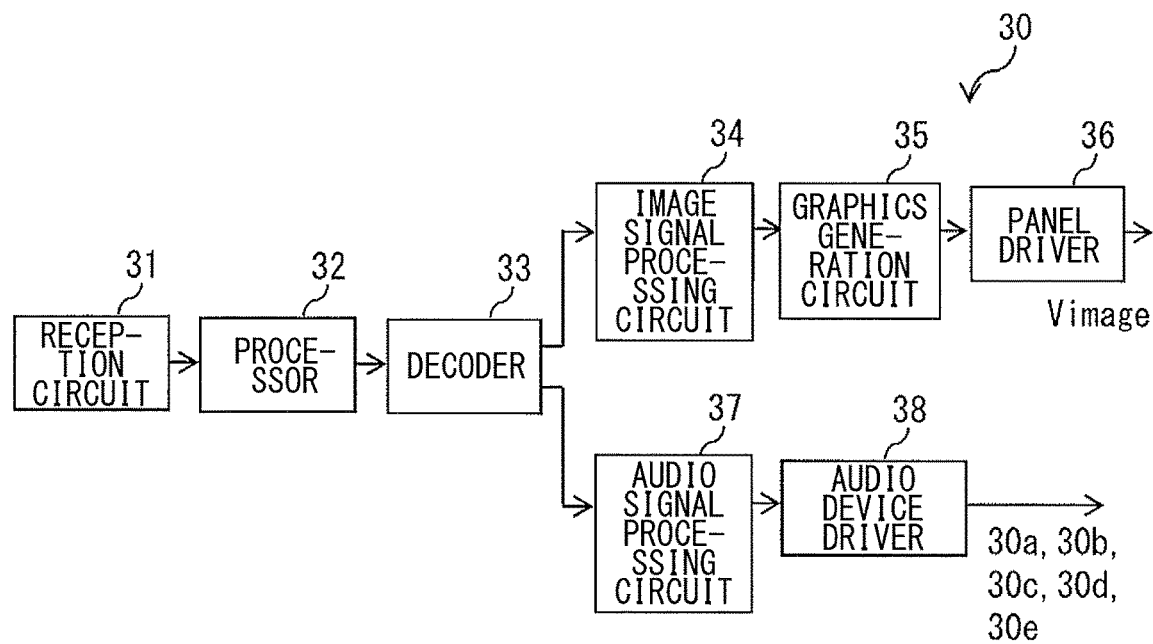

[ FIG. 15 ]
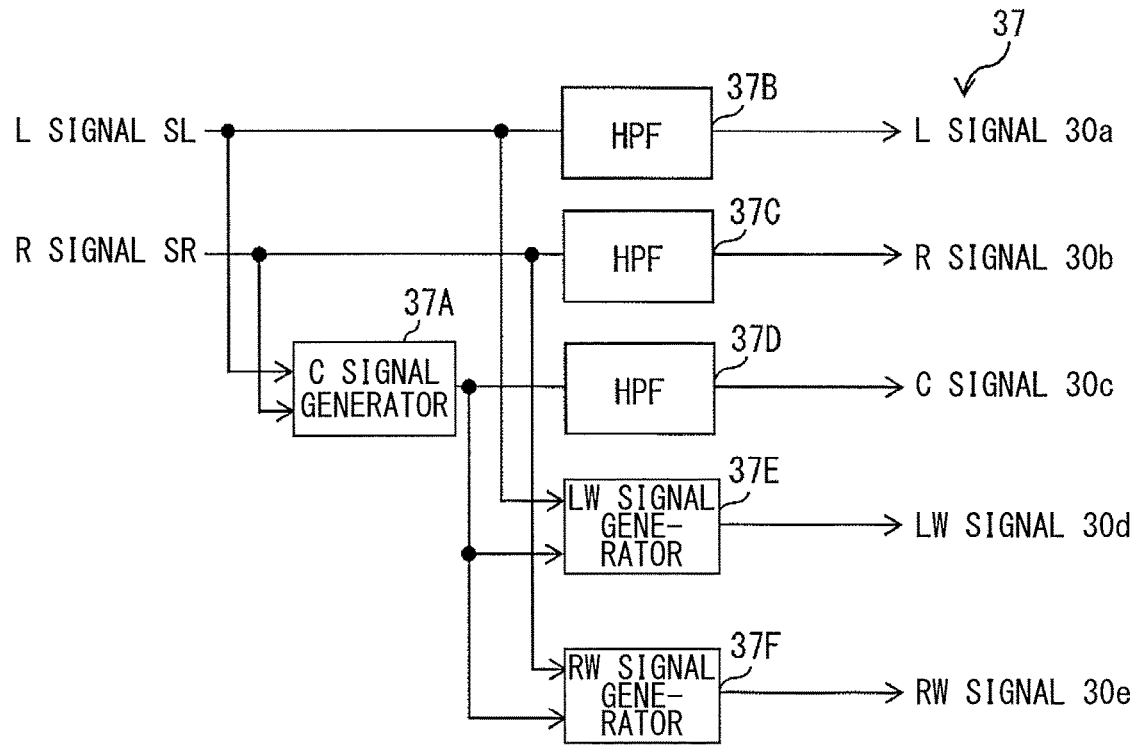
[ FIG. 16 ]
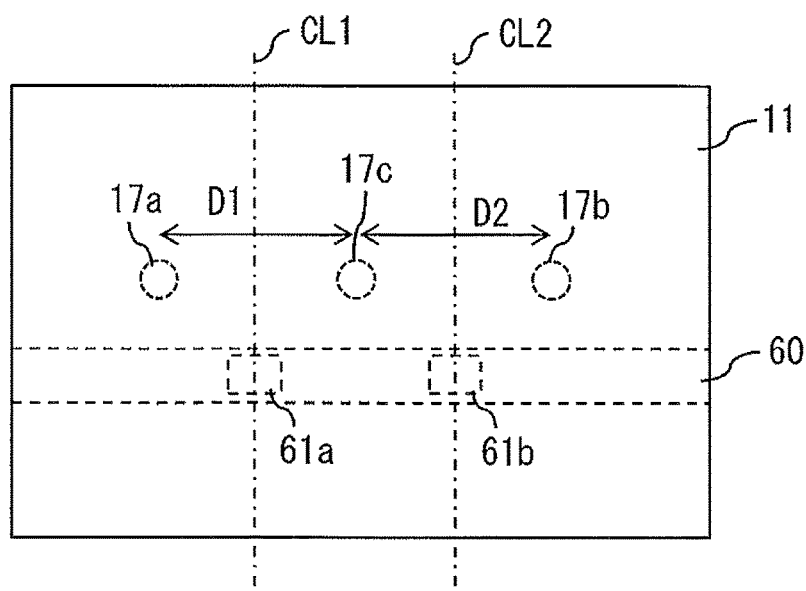

[ FIG. 17 ]
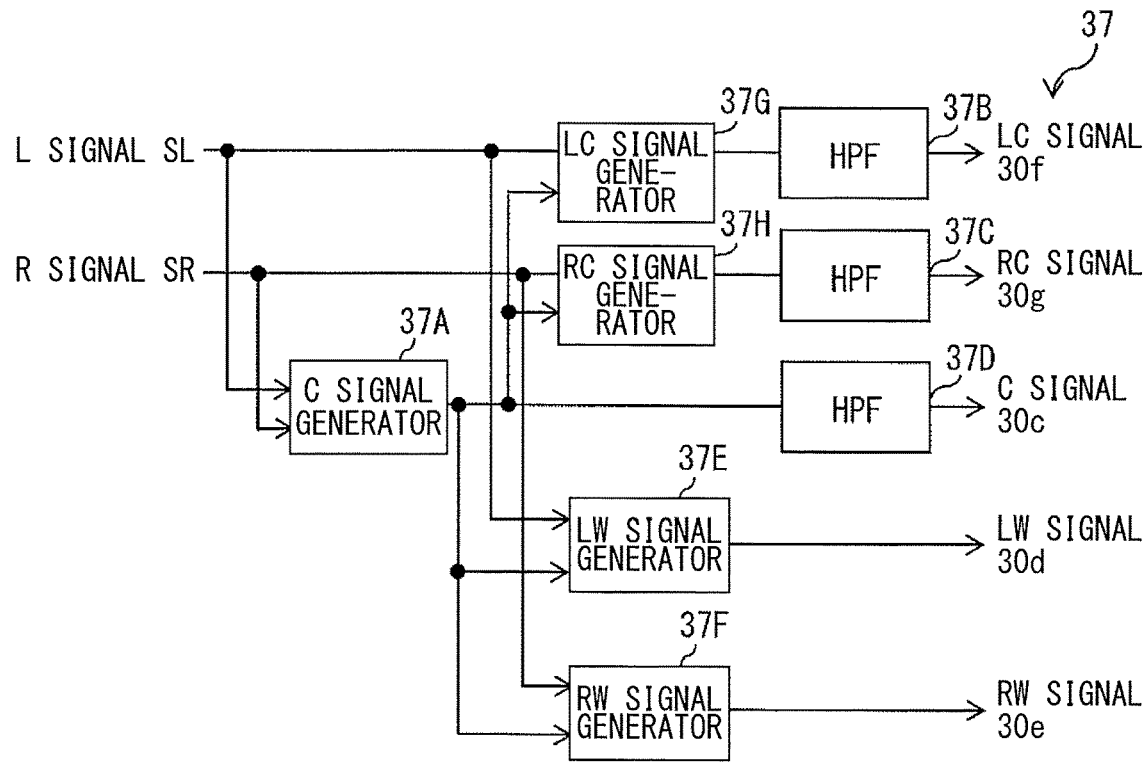
[ FIG. 18 ]
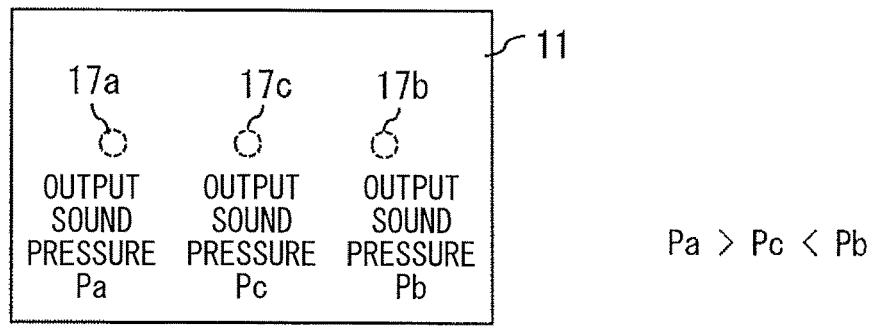
$Pa > Pc < Pb$
[ FIG. 19 ]
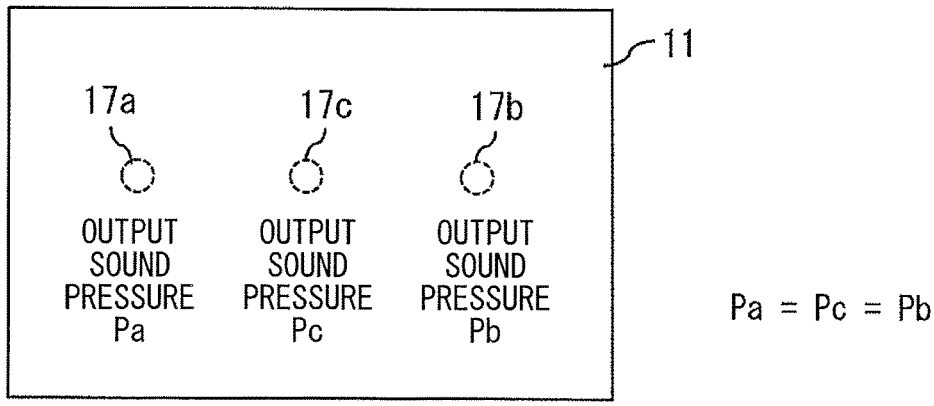
$Pa = Pc = Pb$

[ FIG. 20 ]
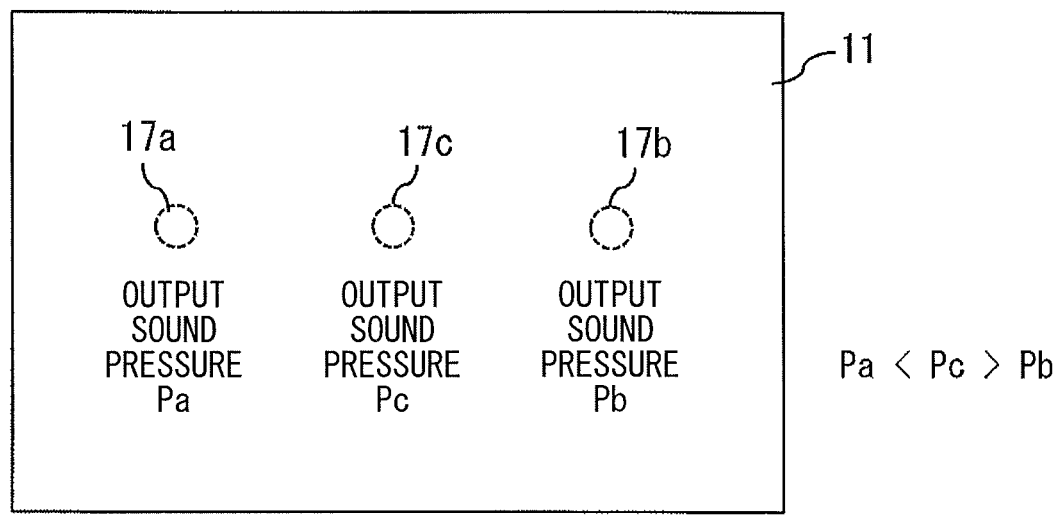
[ FIG. 21 ]
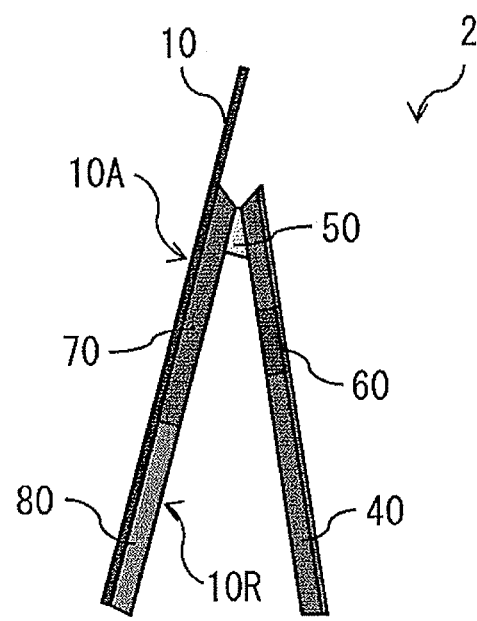

[ FIG. 22 ]
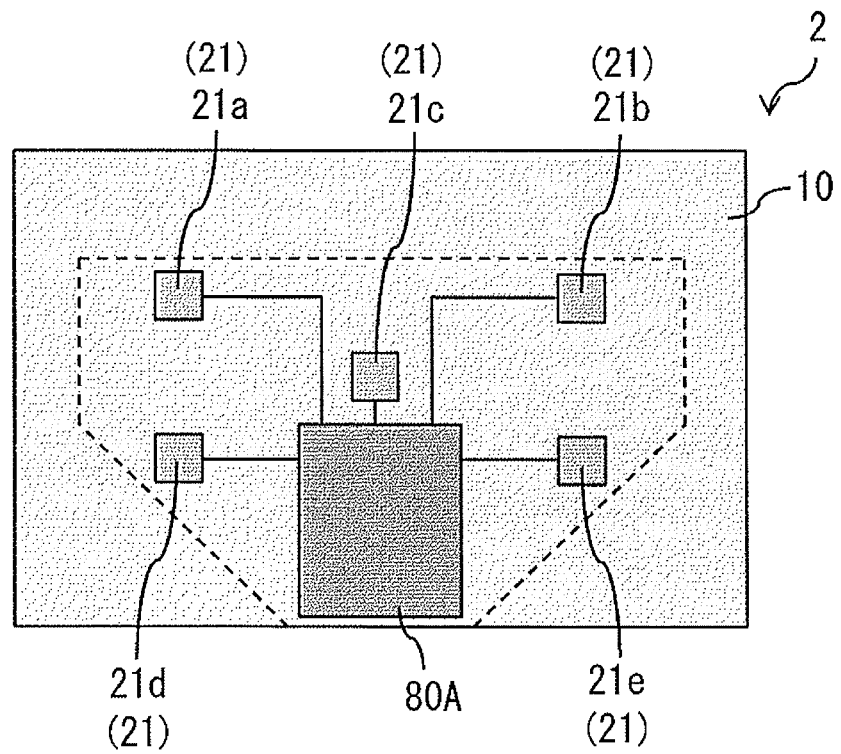
[ FIG. 23 ]
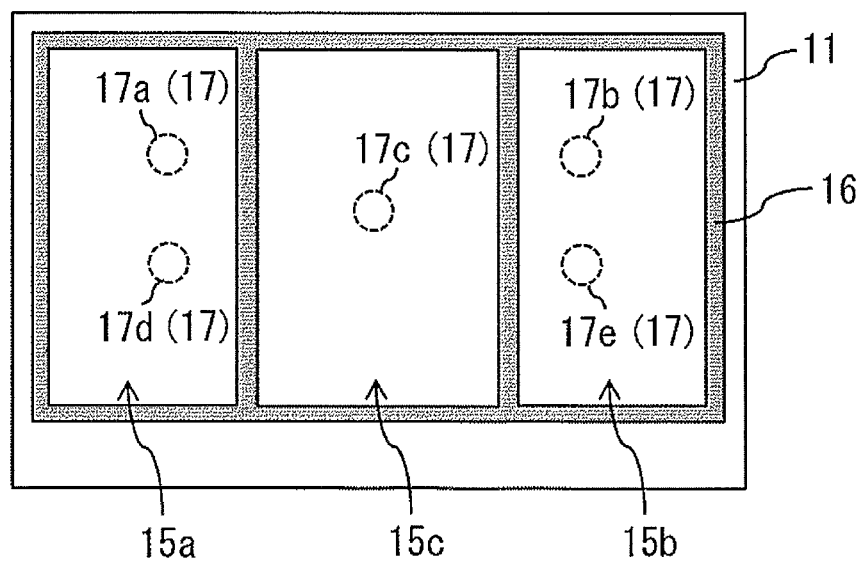

[ FIG. 24 ]
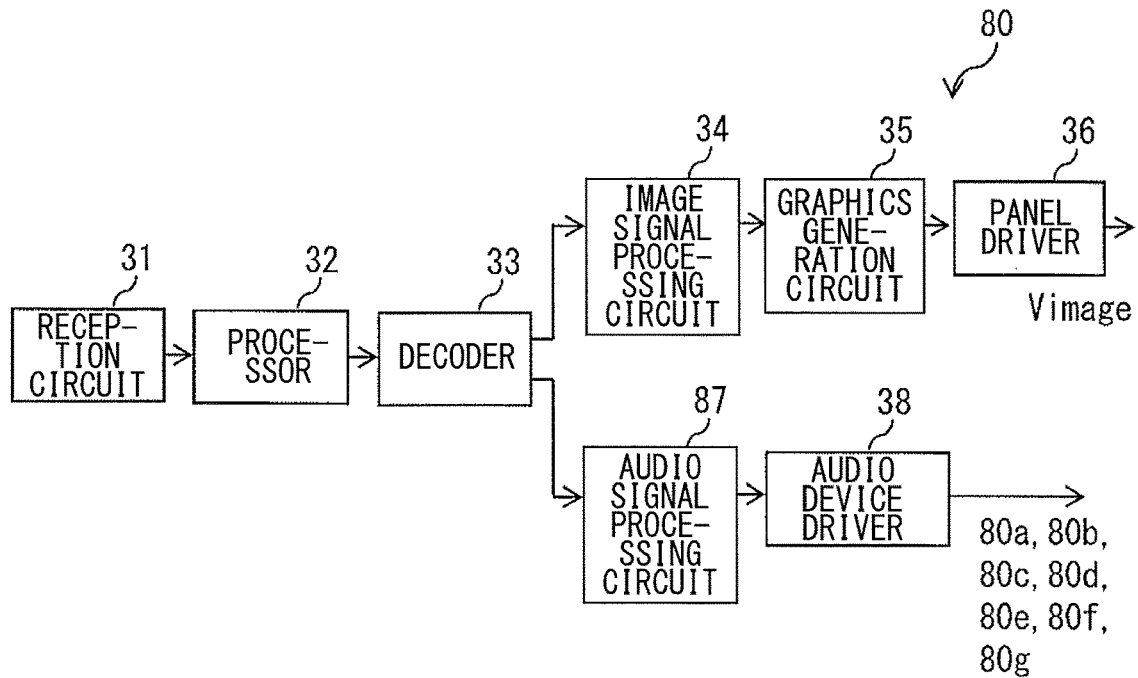
[ FIG. 25 ]
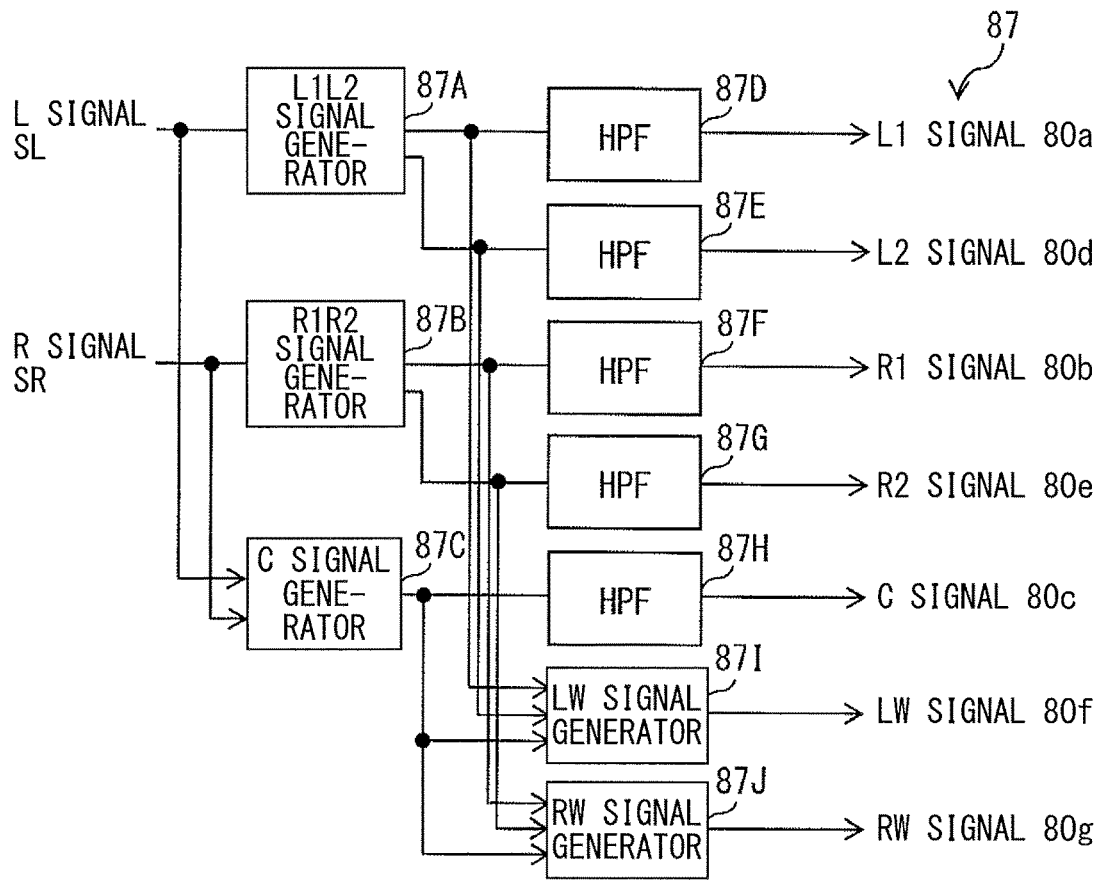

[ FIG. 26 ]
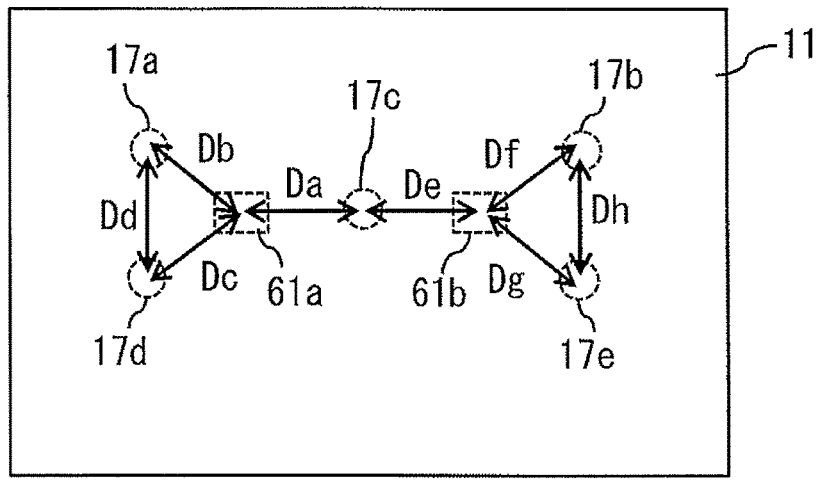
[ FIG. 27 ]
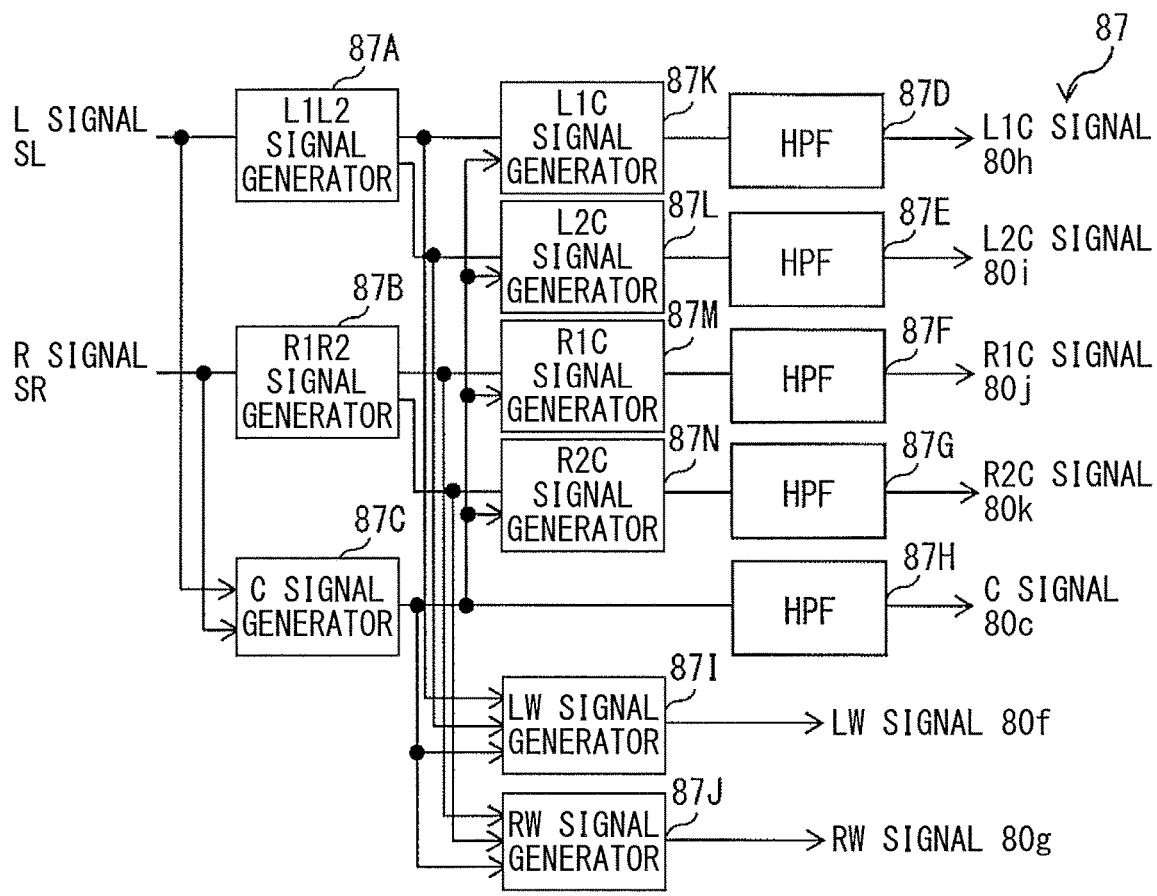

[ FIG. 28 ]
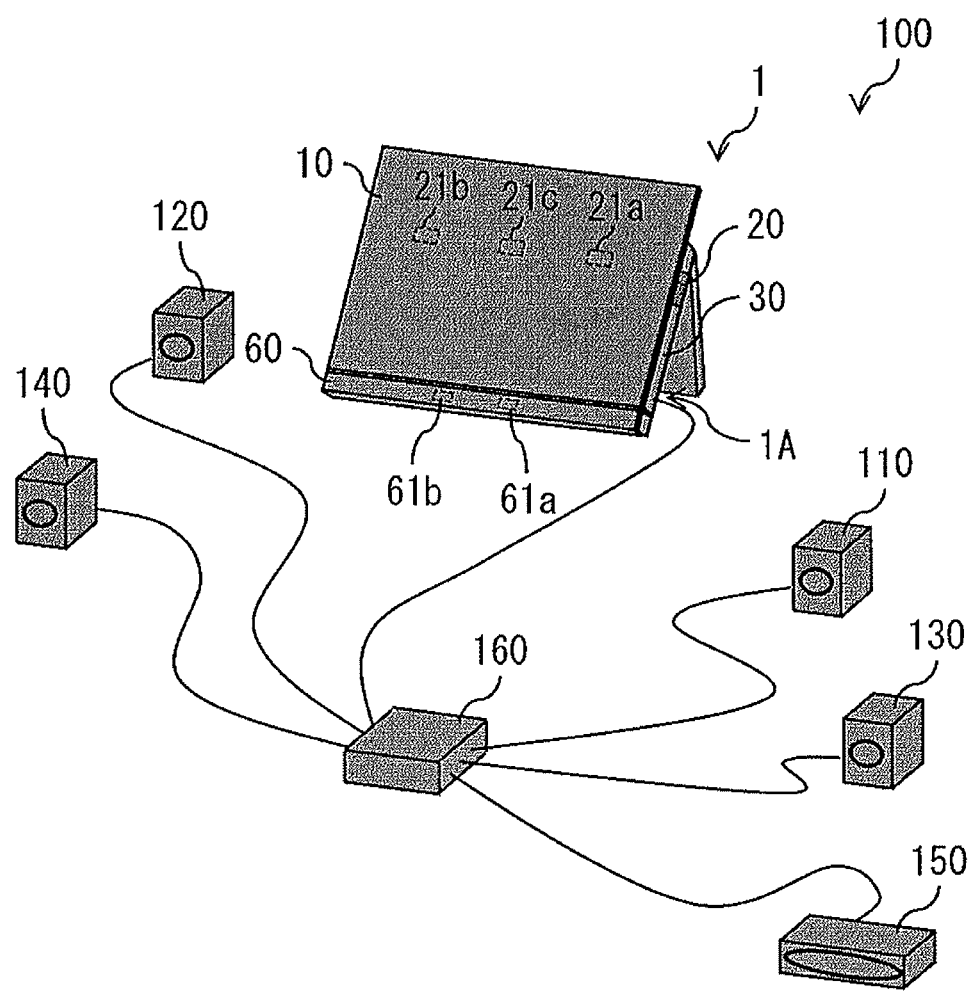

[ FIG. 29 ]
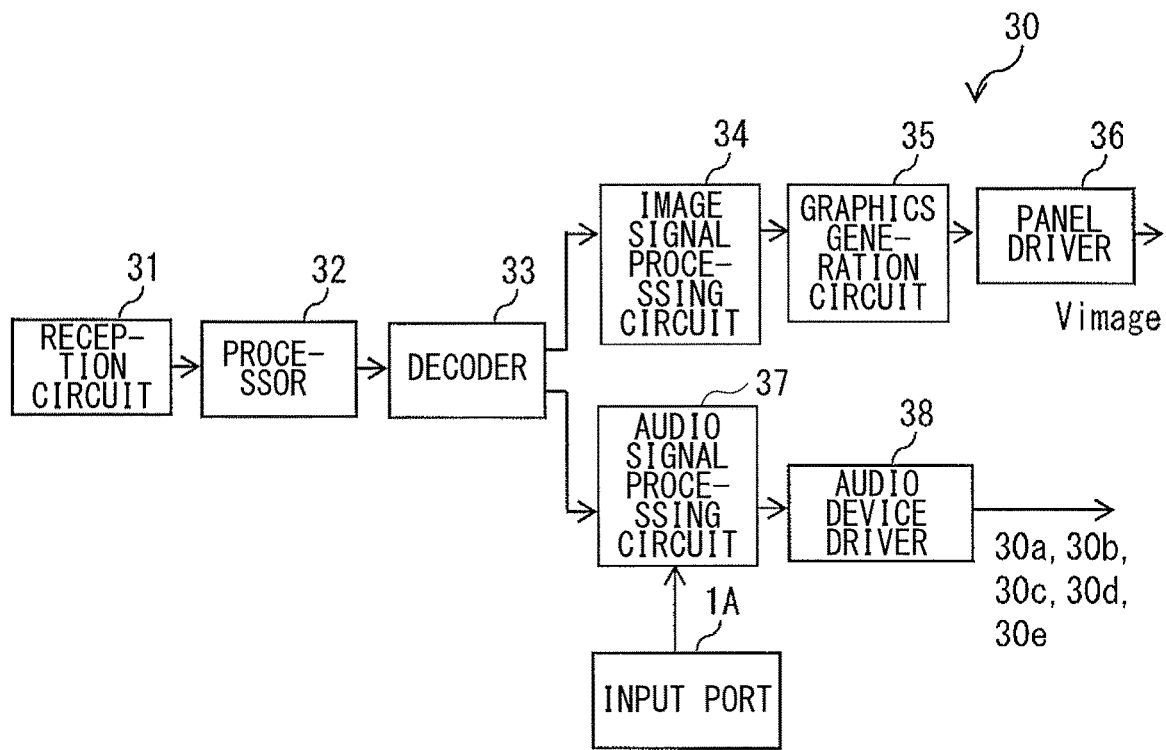

[ FIG. 30 ]
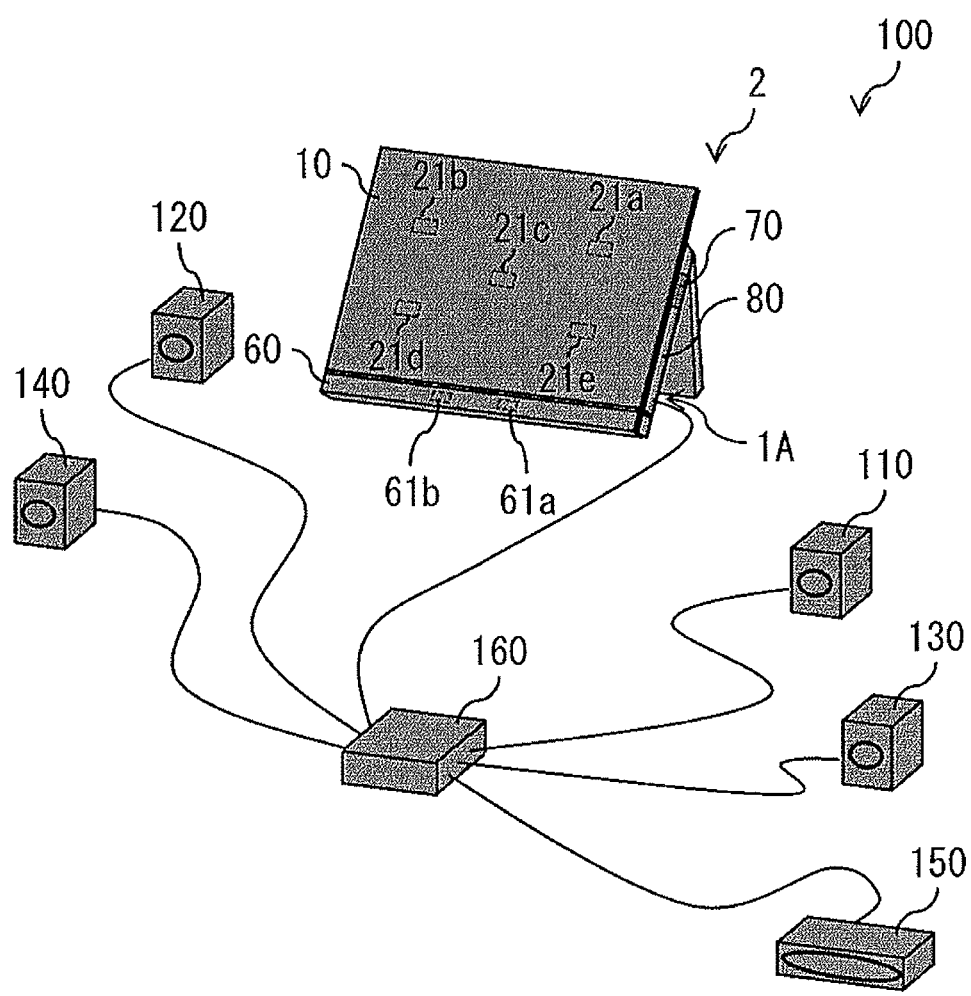

[ FIG. 31 ]
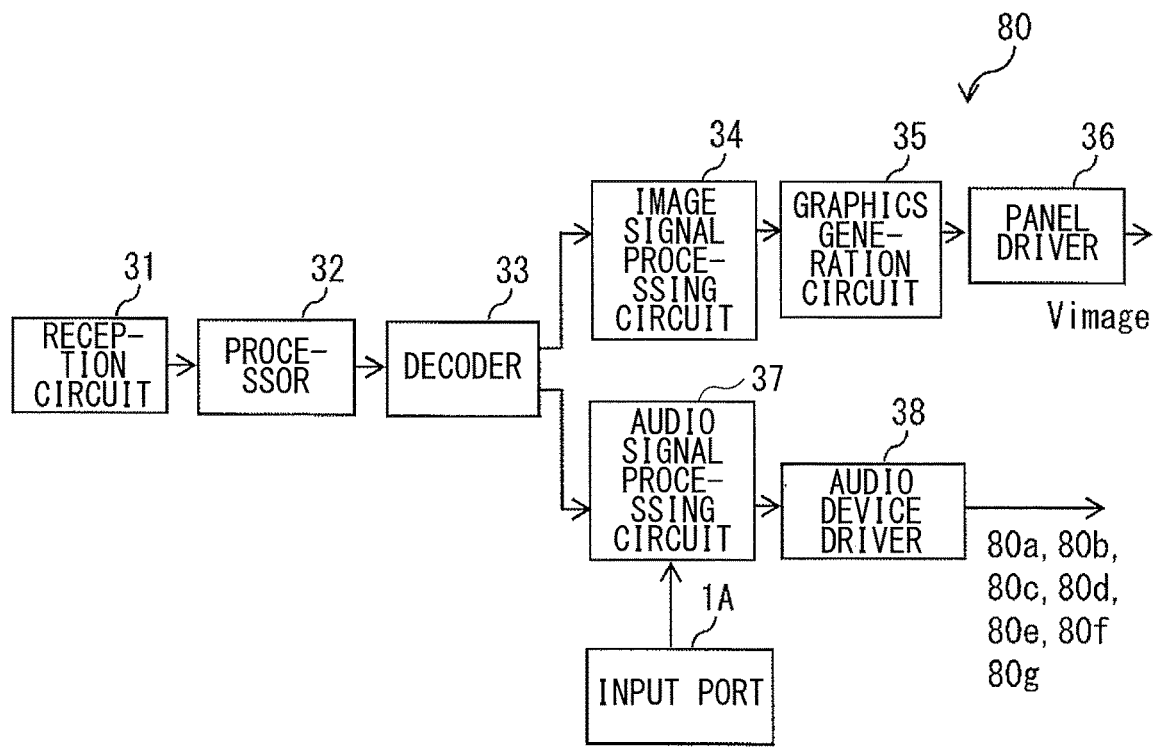
[ FIG. 32 ]
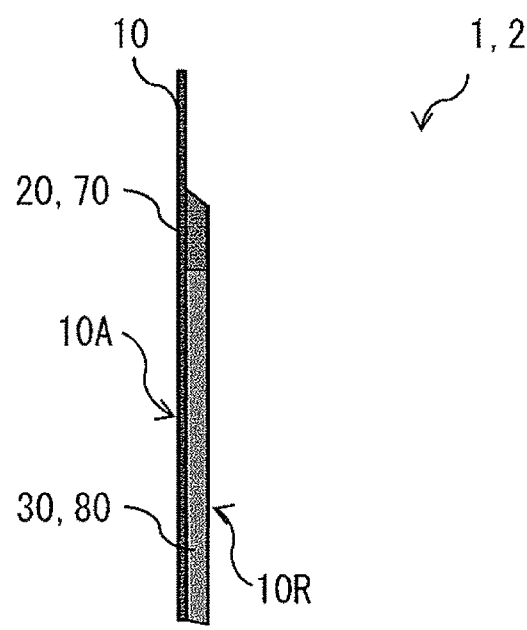

[ FIG. 33 ]
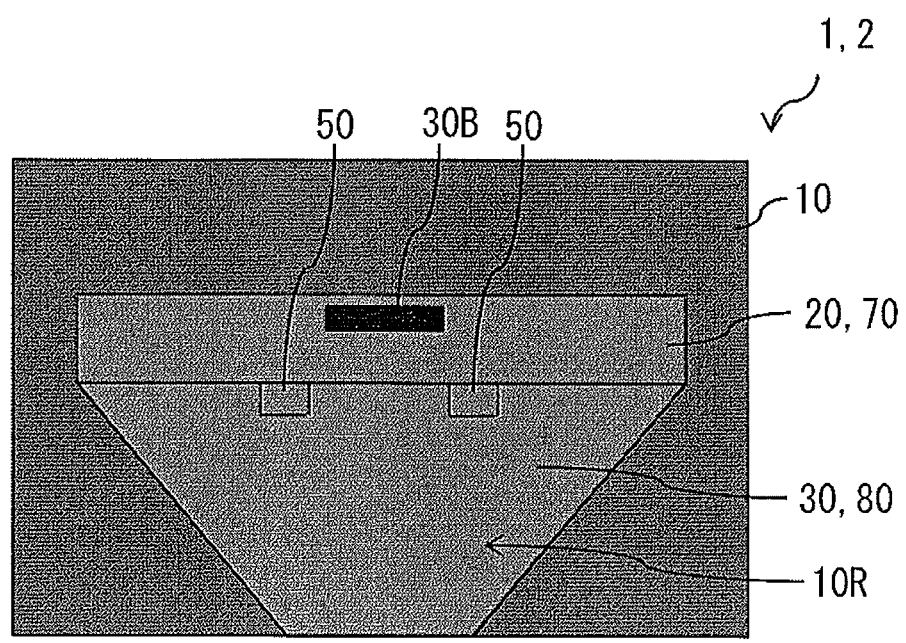

DISPLAY APPARATUS AND SIGNAL GENERATION APPARATUS

CROSS-REFERENCE TO RELATED APPLICATIONS

This application is a national phase entry under 35 U.S.C. § 371 of International Application No. PCT/JP2018/044035 filed Nov. 29, 2018, which claims the priority from Japanese Patent Application No. 2017-254119 filed in the Japanese Patent Office on Dec. 28, 2017, and Japanese Patent Application No. 2018-174059 filed in the Japanese Patent Office on Sep. 18, 2018 the entire contents of which are hereby incorporated by reference.

TECHNICAL FIELD

The present disclosure relates to a display apparatus and a signal generation apparatus.

BACKGROUND ART

Displays are rapidly becoming thinner and lighter. Accordingly, speakers are also becoming thinner and lighter, and using a flat panel speaker (FPS) in place of a cone speaker has been proposed. Moreover, using a display panel as a diaphragm in the flat panel speaker has been also proposed. For example, PTLs 1 to 3 each disclose a flat panel speaker.

CITATION LIST

Patent Literature

PTL 1: Japanese Unexamined Patent Application Publication No. 2007-143010
PTL 2: Japanese Unexamined Patent Application Publication No. 2009-159104
PTL 3: Japanese Unexamined Patent Application Publication (Published Japanese Translation of PCT Application) No. 2002-510182

SUMMARY OF THE INVENTION

In the flat panel speaker field, a further improvement in sound quality is demanded. It is therefore desirable to provide a display apparatus and a signal generation apparatus that make it possible to further improve audio quality.

A display apparatus according to an embodiment of the present disclosure includes: a thin plate-like display cell that displays an image; M exciters that are disposed on a back surface side of the display cell, and vibrate the display cell; and a driving section that drives the display cell and the M exciters. The driving section generates M kinds of first audio signals on the basis of an audio signal obtained from an external signal. The driving section further generates, on the basis of M-O combinations, which are different from one another, of K kinds of the first audio signals selected from the M kinds of the first audio signals (where $2 \leq K < M$ and $1 \leq O < M-1$), a second audio signal for each of the M-O combinations. The driving section further supplies, to the M exciters, M-O kinds of the second audio signals and a third audio signal that is one of the M kinds of the first audio signals.

A signal generation apparatus according to an embodiment of the present disclosure includes a signal processor that generates a signal to be supplied to M exciters on the basis of an audio signal obtained from an external signal. The signal processor generates M kinds of first audio signals on the basis of the audio signal obtained from the external signal. The signal processor further generates, on the basis of M-O combinations, which are different from one another, of K kinds of the first audio signals selected from the M kinds of the first audio signals (where $2 \leq K < M$ and $1 \leq O < M-1$), a second audio signal for each of the M-O combinations. The signal processor further supplies, to the M exciters, M-O kinds of the second audio signals and a third audio signal that is one of the M kinds of the first audio signals.

BRIEF DESCRIPTION OF DRAWINGS

FIG. 1 is a diagram illustrating a side configuration example of a display apparatus according to a first embodiment of the present disclosure.
FIG. 2 is a diagram illustrating a back configuration example of the display apparatus in FIG. 1.
FIG. 3 is a diagram illustrating a configuration example of a back surface of the display apparatus in a case where a rear cover in FIG. 2 is removed.
FIG. 4 is a diagram illustrating a cross-sectional configuration taken along a line A-A in FIG. 3.
FIG. 5 is a diagram illustrating a planar configuration example of a damping member in FIG. 4.
FIG. 6 is a diagram illustrating a functional block example of a signal processor in FIG. 1.
FIG. 7 is a diagram illustrating a functional block example of an audio signal processing circuit in FIG. 6.
FIG. 8 is a diagram illustrating an example of a gain in an HPF in FIG. 7.
FIG. 9 is a diagram illustrating a modification example of functional blocks of the signal processor in FIG. 1.
FIG. 10 is a diagram illustrating a modification example of the cross-sectional configuration taken along the line A-A in FIG. 3.
FIG. 11 is a diagram illustrating a planar configuration example of a damping member in FIG. 10.
FIG. 12 is a diagram illustrating a modification example of a side configuration of the display apparatus in FIG. 1.
FIG. 13 is a diagram illustrating a back configuration example of the display apparatus in FIG. 12.
FIG. 14 is a diagram illustrating a functional block example of a signal processor in FIG. 12.
FIG. 15 is a diagram illustrating an example of functional blocks of an audio signal processing circuit in FIG. 14.
FIG. 16 is a diagram illustrating an example of positions of exciters and bass speakers in the display apparatus in FIG. 12.
FIG. 17 is a diagram illustrating a modification example of the functional blocks of the audio signal processing circuit in FIG. 14.
FIG. 18 is a diagram illustrating an example of an output sound pressure in each of the exciters.
FIG. 19 is a diagram illustrating an example of an output sound pressure in each of the exciters.
FIG. 20 is a diagram illustrating an example of an output sound pressure in each of the exciters.
FIG. 21 is a diagram illustrating a side configuration example of a display apparatus according to a second embodiment of the present disclosure.
FIG. 22 is a diagram illustrating a configuration example of a back surface of the display apparatus in FIG. 21 in a case where a rear cover of the display apparatus is removed.

FIG. 23 is a diagram illustrating a planar configuration example of a damping member in the display apparatus in FIG. 21.

FIG. 24 is a diagram illustrating a functional block example of a signal processor in FIG. 21.

FIG. 25 is a diagram illustrating an example of functional blocks of an audio signal processing circuit in FIG. 24.

FIG. 26 is a diagram illustrating an example of positions of exciters and bass speakers in the display apparatus in FIG. 21.

FIG. 27 is a diagram illustrating a modification example of functional blocks of the audio signal processing circuit in FIG. 25.

FIG. 28 is a diagram illustrating an example of a schematic configuration of an sound system using the display apparatus in FIG. 1.

FIG. 29 is a diagram illustrating a functional block example of the audio signal processing circuit in the display apparatus in FIG. 21.

FIG. 30 is a diagram illustrating an example of a schematic configuration of an sound system using the display apparatus in FIG. 21.

FIG. 31 is a diagram illustrating a functional block example of the audio signal processing circuit in the display apparatus in FIG. 30.

FIG. 32 is a diagram illustrating a side configuration example of a display apparatus in a case where a supporting section is omitted.

FIG. 33 is a diagram illustrating a back configuration example of the display apparatus in FIG. 32.

MODES FOR CARRYING OUT THE INVENTION

Some embodiments of the present disclosure are described below in detail with reference to the drawings. The following description is given of specific examples of the present disclosure, and the present disclosure is not limited to the following embodiments.

1. First Embodiment

[Configuration]

Description is given of a display apparatus 1 according to a first embodiment of the present disclosure. FIG. 1 illustrates a side configuration example of the display apparatus 1 according to the present embodiment. FIG. 2 illustrates a back configuration example of the display apparatus 1 in FIG. 1. The display apparatus 1 displays an image on an image display surface 10A, and outputs sound from the image display surface 10A. In other words, the display apparatus 1 includes a flat panel speaker integrated in the image display surface 10A.

The display apparatus 1 includes, for example, a panel section 10 and an exciting section 20. The panel section 10 displays an image and serves as a diaphragm. The exciting section 20 is disposed on a back surface of the panel section 10, and vibrates the panel section 10. The display apparatus 1 further includes, for example, a signal processor 30 and a supporting section 40. The signal processor 40 controls the exciting section 20. The supporting section 40 supports the panel section 10 with a rotating section 50 interposed therebetween. The rotating section 50 is configured to adjust an inclined angle of the panel section 10 in a case where the back surface of the panel section 10 is supported by the supporting section 40, and includes, for example, a hinge that pivotably supports the panel section 10 and the supporting section 40.

The exciting section 20 and the signal processor 30 are disposed on the back surface of the panel section 10. The panel section 10 includes a rear cover 10R on the back surface of the panel section 10. The rear cover 10R protects the panel section 10, the exciting section 20, and the signal processor 30. The rear cover 10R includes, for example, a plate-like metal sheet or resin sheet. The rear cover 10R is coupled to the rotating section 50.

FIG. 3 illustrates a configuration example of a back surface of the display apparatus 1 in a case where the rear cover 10R is removed. FIG. 3 exemplifies a circuit substrate 30A corresponding to a specific example of the signal processor 30. FIG. 4 illustrates a cross-sectional configuration example taken along a line A-A in FIG. 3. It is to be noted that FIG. 4 exemplifies a cross-sectional configuration of an exciter 21a (an actuator) to be described later; however, this cross-sectional configuration is similar to cross-sectional configurations of other exciters (for example, exciters 21b and 21c (actuators)).

The panel section 10 includes, for example, a thin plate-like display cell 11, an inner plate 12 (a counter plate), and a back chassis 13. The display cell 11 displays an image. The inner plate 12 is opposed to the display cell 11 with a gap 15 interposed therebetween. The inner plate 12 and the back chassis 13 may be integrated. A front surface (a front surface on side opposite to the exciting section 20) of the display cell 11 serves as the image display surface 10A. The panel section 10 further includes, for example, a fixing member 14 between the display cell 11 and the inner plate 12.

The fixing member 14 has a function of fixing the display cell 11 and the inner plate 12 to each other and a function as a spacer maintaining the gap 15. The fixing member 14 is disposed along an outer edge of the display cell 11, for example. The fixing member 14 may have enough flexibility to allow an end edge of the display cell 11 to act as a free end while the display cell 11 is vibrating. The fixing member 14 includes, for example, a sponge having adhesive layers on both surfaces.

The inner plate 12 includes a substrate supporting the exciter 21 (21a, 21b, and 21c). The inner plate 12 has, for example, openings (hereinafter referred to as "exciter openings") at positions where the exciters 21a, 21b, and 21c are located.

The back chassis 13 has higher rigidity than the inner plate 12, and has a role in suppressing deflection or vibrations of the inner plate 12. The back chassis 13 has openings at positions opposed to the openings (for example, the exciter openings) of the inner plate 12, for example. Openings provided at positions opposed to the exciter openings of the openings provided in the back chassis 13 are large enough to insert the exciters 21a, 21b, and 21c. The back chassis 13 includes, for example, a glass substrate. It is to be noted that a metal substrate or a resin substrate having rigidity substantially equal to that of the back chassis 13 may be provided in place of the back chassis 13.

The exciting section 20 includes, for example, three exciters 21a, 21b, and 21c. The exciters 21a, 21b, and 21c have a mutually common configuration.

The exciter 21a is disposed on the left as the display cell 11 is viewed from a back surface. The exciter 21b is disposed on the right as the display cell 11 is viewed from the back surface. The exciter 21c is disposed in the middle in a rightward-leftward direction as the display cell 11 is viewed from the back surface. The exciters 21a, 21b, and 21c are disposed side by side in the rightward-leftward direction of the display cell 11, for example. The exciters 21a, 21b, and 21c are disposed slightly above the middle in an upward-downward direction, for example. The exciters 21a, 21b, and 21c each include, for example, a voice coil, a bobbin on which the voice coil is wound, and a magnetic circuit, and each are a speaker actuator serving as a vibration source. In a case where an audio current of an electrical signal passes through the voice coil, each of the exciters 21a, 21b, and 21c causes the voice coil to generate a driving force in accordance with an electromagnetic action principle. This driving force is transmitted to the display cell 11 through a vibration transmission member 24 to be described later, which causes the display cell 11 to generate vibrations corresponding to change in the audio current, resulting in vibrations in air and change in a sound pressure.

The exciting section 20 further includes, for example, a fixing section 23 and the vibration transmission member 24 for each of the exciters 21a, 21b, and 21c.

The fixing section 23 includes, for example, an opening 23a that fixes a corresponding one of the exciters 21a, 21b, and 21c in a state in which the corresponding one of the exciters 21a, 21b, and 21c is inserted into the opening 23a. The fixing section 23 further includes, for example, a plurality of screw holes 23b for insertion of screws used to fix the fixing section 23 to a projection 12A. Each of the exciters 21a, 21b, and 21c is fixed to the inner plate 12 with the fixing section 23 interposed therebetween, for example. The fixing section 23 may have, for example, a function as a heat sink that dissipates heat generated from the exciters 21a, 21b, and 21c, in addition to fixing the exciters 21a, 21b, and 21c to the inner plate 12.

The vibration transmission member 24 is in contact with, for example, the back surface of the display cell 11 and the bobbin of a corresponding one of the exciters 21a, 21b, and 21c, and is fixed to the back surface of the display cell 11 and the bobbin of the corresponding one of the exciters 21a, 21b, and 21c. The vibration transmission member 24 includes at least a member having a rebounding property in a sonic region (20 Hz or higher). The vibration transmission member 24 includes, for example, a double-faced tape, low-resilience urethane, an adhesive, or the like.

The panel section 10 includes, for example, a damping member 16 between the display cell 11 and the inner plate 12, as illustrated in FIG. 4. The damping member 16 has an action of preventing vibrations generated in the display cell 11 by the respective exciters 21a, 21b, and 21c from interfering with one another. The damping member 16 may include, for example, a material that is allowed to control reflection in the sonic region (20 Hz or higher) with respect to vibrations generated by the exciters 21a, 12b, and 21c. Moreover, the damping member 16 may include, for example, a material that is allowed to absorb vibrations or reverberation generated by the exciters 21a, 21b, and 21c. The damping member 16 is disposed in a space, i.e., the gap 15 between the display cell 11 and the inner plate 12. The damping member 16 is fixed to at least the back surface of the display cell 11 of the back surface of the display cell 11 and a front surface of the inner plate 12. The damping member 16 is in contact with the front surface of the inner plate 12, for example.

The damping member 16 includes, for example, a stacked body in which an adhesive layer (or a pressure-sensitive adhesive layer), a sponge layer, a base layer, a sponge layer, and an adhesive layer (or a pressure-sensitive adhesive layer) are stacked in this order from the display cell 11. The adhesive layer located closer to the display cell 11 is in contact with the back surface of the display cell 11, and fixes the damping member 16 to the back surface of the display cell 11. The two sponge layers are layers having the action described above. The two sponge layers include, for example, a flexible member having a poor self-standing property. At this time, the damping member 16 includes sponge as the flexible member having the poor self-standing property, and further includes a pressure-sensitive adhesive layer or an adhesive layer that fixes the sponge to the back surface of the display cell 11.

It is to be noted that the damping member 16 is not limited to the configuration described above as long as the damping member 16 has the action described above. The damping member 16 may include, for example, a pressure-sensitive adhesive or an adhesive as the flexible member having the poor self-standing property. The damping member 16 may have a configuration similar to that of the vibration transmission member 24 or the fixing section 23. The damping member 16 may include, for example, a magnet sheet fixed to the display cell 11 or a hook-and-loop fastener fixed to the display cell 11 and the inner plate 12.

FIG. 5 illustrates a planar configuration example of the damping member 16. Here, in the back surface of the display cell 11, a position opposed to the exciter 21a is referred to as an excitation point 17a, a position opposed to the exciter 21b is referred to as an excitation point 17b, and a position opposed to the exciter 21c is referred to as an excitation point 17c. At this time, the damping member 16 partitions the back surface of the display cell 11 into a partition region 15a including the excitation point 17a, a partition region 15b including the excitation point 17b, and a partition region 15c including the excitation point 17c. The damping member 16 may include, for example, one member that forms the partition regions 15a, 15b, and 15c, as illustrated in FIG. 5. The damping member 16 may include, for example, members formed separately for the respective partition regions 15a, 15b, and 15c. In the damping member 16, at least one of the partition regions 15a, 15b, or 15c may include, for example, a member separated from a member forming other partition regions.

The damping member 16 may be configured to dispose each of the excitation points 17a, 17b, and 17c (or the exciters 21a, 21b, and 21c) at a position out of a center of a corresponding one of the partition regions 15a, 15b, and 15c, for example, as illustrated in FIG. 5. In terms of suppression of a standing wave, each of the excitation points 17a, 17b, and 17c (or the exciters 21a, 21b, and 21c) is preferably disposed at a position out of the center of the corresponding one of the partition regions 15a, 15b, and 15c. The "centers of the partition region 15a, 15b, and 15c" respectively indicate, for example, vertically and horizontally central positions of the partition regions 15a, 15b, and 15c in a case where the partition regions 15a, 15b, and 15c each have a rectangular shape as illustrated in FIG. 5. The "centers of the partition regions 15a, 15b, and 15c" respectively indicate, for example, intersections of a central line of a shortest vertical distance and a central line of a shortest horizontal distance in the partition regions 15a, 15b, and 15c in a case where the partition regions 15a, 15b, and 15c are surrounded by the damping member 16.

The damping member 16 may be formed to cause each of the partition regions 15a, 15b, and 15c to become a closed region in the back surface of the display cell 11, for example, as illustrated in FIG. 5. The damping member 16 may be formed to cause the respective partition regions 15a, 15b, and 15c to be communicated with one another and partitioned in the back surface of the display cell 11, for example.

In the damping member 16, for example, sizes of the partition regions 15*a* and 15*b* on both the left and the right may be smaller than a size of the partition region 15*c* in the middle. In a case where the sizes of the partition regions 15*a* and 15*b* on both the left and the right are smaller than the size of the partition region 15*c* in the middle, vibrations by the exciter 21*c* make it easy to output a low sound range from a central portion of the display cell 11 and make it difficult to output a high sound range from the central portion of the display cell 11. Further vibrations by the exciters 21*a* and 21*b* make it easy to output the high sound range from portions on both the left and the right of the display cell 11 and make it difficult to output the low sound range from the portions on both the left and the right of the display cell 11.

In the damping member 16, for example, the sizes of the partition regions 15*a* and 15*b* on both the left and the right are larger than the size of the partition region 15*c* in the middle. In a case where the sizes of the partition regions 15*a* and 15*b* on both the left and the right are larger than the size of the partition region 15*c* in the middle, vibrations by the exciter 21*c* make it easy to output the high sound range from the central portion of the display cell 11 and make it difficult to output the low sound range from the central portion of the display cell 11. Further, vibrations by the exciters 21*a* and 21*b* make it easy to output the low sound range from portions on both the left and the right of the display cell 11 and makes it difficult to output the high sound range from the portions on both the left and the right of the display cell 11.

The panel section 10 further includes, for example, an adhesive layer 18 or a pressure-sensitive adhesive layer 19 disposed between the inner plate 12 and the back chassis 13, as illustrated in FIG. 4. The adhesive layer 18 or the pressure-sensitive adhesive layer 19 is a layer that fixes the inner plate 12 and the back chassis 13 to each other.

The adhesive layer 18 or the pressure-sensitive adhesive layer 19 has an action of preventing vibrations generated in the display cell 11 by two exciters 21*a* and 21*b* adjacent to each other from interfering with each other. The adhesive layer 18 or the pressure-sensitive adhesive layer 19 also has an action of preventing vibrations generated in the display cell 11 by two exciters 21*b* and 21*c* adjacent to each other from interfering with each other.

The adhesive layer 18 or the pressure-sensitive adhesive layer 19 may include a material that is allowed to control reflection in the sonic region (20 Hz or higher) with respect to vibrations generated by the exciters 21*a*, 21*b*, and 21*c*. Moreover, the adhesive layer 18 or the pressure-sensitive adhesive layer 19 may include, for example, a material that is allowed to absorb vibrations or reverberation generated by the exciters 21*a*, 21*b*, and 21*c*.

FIG. 6 illustrates a functional block example of the signal processor 30. The signal processor 30 (the circuit substrate 30A) includes, for example, a reception circuit 31. The reception circuit 31 has a configuration corresponding to a kind of a signal to be received. For example, in a case where the reception circuit 31 receives a television broadcast signal, the reception circuit 31 includes, for example, an antenna terminal, a digital tuner, and a demultiplexer.

The antenna terminal is a terminal to which the television broadcast signal received by an reception antenna (not illustrated) is inputted. The digital tuner processes the television broadcast signal inputted to the antenna terminal, and outputs a predetermined transport stream corresponding to a channel selected by a user, for example. The demultiplexer extracts, for example, a partial TS (Transport Stream) corresponding to the channel selected by the user from the transport stream obtained by the digital tuner, and outputs the extracted partial TS to a processor 32.

For example, in a case where the reception circuit 31 receives an IP (Internet Protocol) signal through an Internet connection, the reception circuit 31 receives an IP signal through the Internet connection, and performs standard protocol processing in an IP network on the received IP signal. Further, the reception circuit 31 extracts a partial TS corresponding to a channel selected by the user from the signal having been subjected to the protocol processing, and outputs the extracted partial TS to the processor 32.

The signal processor 30 (the circuit substrate 30A) further includes, for example, the processor 32. The processor 32 controls an operation of each of components of the display apparatus 1. The processor 32 transmits the partial TS obtained by the reception circuit 31 to a decoder 33, for example. The signal processor 30 (the circuit substrate 30A) further includes, for example, the decoder 33, an image signal processing circuit 34, a graphics generation circuit 35, a panel driver 36, an audio signal processing circuit 37, and an audio device driver 38.

The decoder 33 performs decoding processing, for example, on an image PES (Packetized Elementary Stream) packet included in the partial TS obtained by the reception circuit 31 to obtain image data. The decoder 33 also performs decoding processing, for example, on an audio PES packet included in the partial TS obtained by the reception circuit 31 to obtain audio data.

The image signal processing circuit 34 and the graphics generation circuit 35 perform, for example, multi-image processing, and graphics data superimposition processing, etc. on the image data obtained by the decoder 33, if necessary. The image signal processing circuit 34 performs predetermined processing on the image data, and outputs the image data having been subjected to the predetermined processing to the graphics generation circuit 35. The graphics generation circuit 35 generates a UI (User Interface) screen used for screen display, for example. The panel driver 36 drives the panel section 10 on the basis of the image data outputted from the graphics generation circuit 35, for example.

The audio signal processing circuit 37 performs, for example, predetermined processing on the audio data (an L signal SL and an R signal SR obtained from an external signal) obtained by the decoder 33, and performs processing such as D/A conversion. The audio signal processing circuit 37 generates, for example, a signal (for example, an L signal 30*a*) to be supplied to the exciter 21*a*, a signal (for example, an R signal 30*b*) to be supplied to the exciter 21*b*, and a signal (for example, a C signal 30*c*) to be supplied to the exciter 21*c*. The audio device driver 38 amplifies, for example, various kinds of audio signals outputted from the audio signal processing circuit 37 and supplies the thus-amplified audio signals to the exciting section 20, thereby driving the exciting section 20.

FIG. 7 illustrates a functional block example of the audio signal processing circuit 37. It is to be noted that a D/A converter is omitted in FIG. 7. The audio signal processing circuit 37 performs D/A conversion on the audio data (the L signal SL and the R signal SR) obtained from the decoder 33 to generate the L signal 30*a* and the R signal 30*b*. The audio signal processing circuit 37 further generates the C signal 30*c* on the basis of the L signal 30*a* and the R signal 30*b*.

The audio signal processing circuit 37 causes the L signal SL to pass through an HPF 37B, thereby generating the L signal 30*a* in which a predetermined low range is cut (or attenuated). The HPF 37B cuts (or attenuates) the predetermined low range in the L signal SL to generate the L signal 30a. The audio signal processing circuit 37 causes the R signal SR to pass through an HPF 37C, thereby generating the R signal 30b in which a predetermined low range is cut (or attenuated). The HPF 37B cuts (or attenuates) the predetermined low range in the R signal SR to generate the R signal 30b.

The audio signal processing circuit 37 causes the L signal SL and the R signal SR to pass through a C signal generator 37A, thereby generating a C signal 30c' based on the L signal SL and the R signal SR. The C signal generator 37A generates the C signal 30c' on the basis of the L signal SL and the R signal SR. The audio signal processing circuit 37 causes the C signal 30c' to pass through an HPF 37D, thereby generating the C signal 30c in which a predetermined low range is cut (or attenuated). The HPF 37D cuts (or attenuates) the predetermined range in the C signal 30c' to generate the C signal 30c.

FIG. 8 illustrates an example of gains in the HPF 37B, the HPF 37C, and the HPF 37D. In the present modification example, cutoff frequencies in the HPF 37B, the HPF 37C, and the HPF 37D become f1 at low volume, and become f2 (>f1) at high volume. By doing so, signals in the low sound range included in the L signal SL and the R signal SR are cut (or attenuated) at high volume. As a result, it is possible to suppress generation of screen shaking in the display cell 11 by the signals in the low sound range included in the L signal SL and the R signal SR.

For example, in place of the panel section 10, a resistor is coupled to an output terminal of the audio device driver 38, and a signal passing through the resistor is analyzed by a signal analyzer or the like, which makes it possible to specify fluctuations of the cutoff frequencies in the HPF 37B, the HPF 37C, and the HPF 37D.

It is to be noted that in the present modification example, the audio signal processing circuit 37 may change the cutoff frequencies in the HPF 37B, the HPF 37C, and the HPF 37D in accordance with a volume level. For example, the audio signal processing circuit 37 may increase the cutoff frequencies in the HPF 37B, the HPF 37C, and the HPF 37D with an increase in the volume level. Doing so makes it possible to effectively suppress generation of screen shaking in the display cell 11 by the signals in the low sound range included in the L signal SL and the R signal SR.

[Effects]

Next, description is given of effects of the display apparatus 1 according to the present embodiment.

Displays are rapidly becoming thinner and lighter. Accordingly, speakers are also becoming thinner and lighter, and using a flat panel speaker (FPS) in place of a cone speaker has been proposed. Moreover, using a display panel as a diaphragm in the flat panel speaker has been also proposed. In the flat panel speaker field, a further improvement in sound quality is demanded.

In contrast, in the display apparatus 1 according to the present embodiment, the predetermined low range in audio signals (the L signal SL and the R signal SR) obtained from the external signal is attenuated at high volume to generate the L signal 30a, the R signal 30b, and the C signal 30c. This makes it possible to suppress generation of screen shaking in the display cell 11 by the signals in the low sound range included in the L signal SL and the R signal SR.

2. Modification Examples of First Embodiment

Next, description is given of modification examples of the display apparatus 1 according to the foregoing first embodiment.

[Modification Example A]

In the display apparatus 1 according to the foregoing first embodiment, the audio signal processing circuit 37 may further include, for example, an LC signal generator 37G and an RC signal generator 37H, as illustrated in FIG. 9.

The audio signal processing circuit 37 causes the L signal SL and the C signal 30c' to pass through the LC signal generator 37G, thereby generating a signal (an LC signal 30f') to be inputted to the HPF 37B. The LC signal generator 37G generates the LC signal 30f' on the basis of the L signal SL and the C signal 30c'. The audio signal processing circuit 37 causes the LC signal 30f' to pass through the HPF 37B, thereby generating a signal (an LC signal 30f) to be supplied to the exciter 21a. The HPF 37B cuts (or attenuates) a predetermined low range in the LC signal 30f' to generate the LC signal 30f.

The audio signal processing circuit 37 causes the R signal SR and the C signal 30c' to pass through the RC signal generator 37H, thereby generating a signal (an RC signal 30g') to be inputted to the HPF 37C. The RC signal generator 37H generates the RC signal 30g' on the basis of the R signal SR and the C signal 30c'. The audio signal processing circuit 37 causes the RC signal 30g' to pass through the HPF 37C, thereby generating a signal (an RC signal 30g) to be supplied to the exciter 21b. The HPF 37C cuts (or attenuates) a predetermined low range in the RC signal 30g' to generate the RC signal 30g.

The LC signal generator 37G outputs the L signal SL at low volume, and outputs the LC signal 30f' at high volume. The RC signal generator 37H outputs the R signal SR at low volume, and outputs the RC signal 30g' at high volume. Thus, in the present modification example, the L signal 30a and the R signal 30b are supplied to the excitation points 17a and 17b at low volume, and the LC signal 30f and the RC signal 30g corrected with use of the C signal 30c are supplied to the excitation points 17a and 17b at high volume. Accordingly, as compared to a case where the L signal 30a and the R signal 30b are always supplied to the exciters 21a and 21b, it is possible to keep sound pressure balance of LCR channels even at high volume. This makes it possible to improve sound quality.

For example, in place of the panel section 10, a resistor is coupled to the output terminal of the audio device driver 38, and a signal passing through the resistor is analyzed by a signal analyzer, or the like, which makes it possible to specify switching of an output signal in the LC signal generator 37G and the RC signal generator 37H.

[Modification Example B]

In the display apparatus 1 according to the foregoing first embodiment and the modification example thereof, the panel section 10 may include, for example, a plurality of exciters 21 for each of the partition regions 15a, 15b, and 15c, as illustrated in FIG. 10. In the present modification example, the panel section 10 may include, for example, a plurality of (for example, two) exciters 21a in the partition region 15a. Likewise, in the display apparatus 1 according to the foregoing embodiment, the panel section 10 may include a plurality of (for example, two) exciters 21b in the partition region 15b. Likewise, in the display apparatus 1 according to the foregoing embodiment, the panel section 10 may include a plurality of (for example, two) exciters 21c in the partition region 15c.

At this time, for example, a plurality of excitation points 17 corresponding to the plurality of exciters 21 is disposed side by side in one line in each of the partition regions 15a, 15b, and 15c, as illustrated in FIG. 11. Here, for example, the plurality of excitation points 17 is disposed side by side in the upward-downward direction of the display cell 11 in each of the partition regions 15a, 15b, and 15c. For example, the plurality of excitation points 17 may be disposed side by side in the rightward-leftward direction of the display cell 11 in each of the partition regions 15a, 15b, and 15c. For example, the plurality of excitation points 17 may be disposed side by side in the upward-downward direction of the display cell 11 in each of the partition regions 15a and 15b, and may be disposed side by side in the rightward-leftward direction of the display cell 11 in the partition region 15c.

[Modification Example C]

The display apparatus 1 according to the foregoing first embodiment and the modification examples thereof may further include, for example, a bass speaker section 60, as illustrated in FIGS. 12 and 13. FIG. 12 illustrates a side configuration example of the display apparatus 1 according to the present modification example. FIG. 13 illustrates a back configuration example of the display apparatus 1 according to the present modification example.

The bass speaker section 60 is provided inside the supporting section 40, for example. The bass speaker section 60 includes a bass speaker 61a disposed relatively on the left as viewed from the back surface of the display apparatus 1 and a bass speaker 61b disposed relatively on the right as viewed from the back surface of the display apparatus 1.

FIG. 14 illustrates a functional block example of the signal processor 30. FIG. 15 illustrates a functional block example of the audio signal processing circuit 37. It is to be noted that a D/A converter is omitted in FIG. 15. The audio signal processing circuit 37 performs, for example, predetermined processing on the audio data (the L signal SL and the R signal SR) obtained by the decoder 33, and performs processing such as D/A conversion. The audio signal processing circuit 37 generates, for example, a signal (for example, the L signal 30a) to be supplied to the exciter 21a, a signal (for example, the R signal 30b) to be supplied to the exciter 21b, a signal (for example, the C signal 30c) to be supplied to the exciter 21c, a signal (for example, an LW signal 30d) to be supplied to the bass speaker 61a, and a signal (for example, an RW signal 30e) to be supplied to the bass speaker 61b. The audio device driver 38 amplifies, for example, various kinds of audio signals outputted from the audio signal processing circuit 37 and supplies the thus-amplified audio signals to the exciting section 20 and the bass speaker section 60, thereby driving the exciting section 20 and the bass speaker section 60.

The audio signal processing circuit 37 causes the L signal SL to pass through the HPF 37B, thereby generating the L signal 30a in which a predetermined low range is cut (or attenuated). The HPF 37B cuts (or attenuates) the predetermined low range in the L signal SL to generate the L signal 30a. The audio signal processing circuit 37 causes the R signal SR to pass through the HPF 37C, thereby generating the R signal 30b in which a predetermined low range is cut (or attenuated). The HPF 37C cuts (or attenuates) the predetermined low range in the R signal SR to generate the R signal 30b.

The audio signal processing circuit 37 causes the L signal SL and the R signal SR to pass through the C signal generator 37A, thereby generating the C signal 30c' based on the L signal SL and the R signal SR. The C signal generator 37A generates the C signal 30c' on the basis of the L signal SL and the R signal SR. The audio signal processing circuit 37 causes the C signal 30c' to pass through the HPF 37D, thereby generating the C signal 30c in which a predetermined low range is cut (or attenuated). The HPF 37D cuts (or attenuates) the predetermined low range in the C signal 30c' to generate C signal 30c.

The audio signal processing circuit 37 causes the L signal SL and the C signal 30c to pass through an LW signal generator 37E, thereby generating the LW signal 30d. The LW signal generator 37E generates the LW signal 30d on the basis of the L signal SL and the C signal 30c. The audio signal processing circuit 37 causes the R signal SR and the C signal 30c to pass through an RW signal generator 37F, thereby generating the RW signal 30e. The RW signal generator 37F generates the RW signal 30e on the basis of the R signal SR and the C signal 30c. In other words, the display apparatus 1 according to the present modification example serves as a 3.2-ch sound system.

In the present modification example, the cutoff frequencies in the HPF 37B, the HPF 37C, and the HPF 37D become f1 at low volume, and become f2 (>f1) at high volume. By doing so, signals in the low sound range included in the L signal SL and the R signal SR are cut (or attenuated) at high volume. As a result, it is possible to suppress generation of screen shaking in the display cell 11 by the signals in the low sound range included in the L signal SL and the R signal SR.

It is to be noted that in the present modification example, the audio signal processing circuit 37 may change the cutoff frequencies in the HPF 37B, the HPF 37C, and the HPF 37D in accordance with a volume level. For example, the audio signal processing circuit 37 may increase the cutoff frequencies in the HPF 37B, the HPF 37C, and the HPF 37D with an increase in the volume level. Doing so makes it possible to effectively suppress generation of screen shaking in the display cell 11 by the signals in the low sound range included in the L signal SL and the R signal SR.

Moreover, in the present modification example, signals (the LW signal 30d and the RW signal 30e) obtained by correcting the L signal 30a and the R signal 30b with use of the C signal 30c are supplied to the bass speaker section 60. This makes it possible to supply, to the bass speaker section 60, an audio signal having a woofer characteristic suitable for characteristics of the exciters 21a, 21b, and 21c. Accordingly, it is possible to improve sound quality in the low sound range.

[Modification Example D]

In the foregoing modification example C, positions of the excitation points 17a, 17b, and 17c, and the bass speaker 61a and 61b are preferably symmetric (bilaterally symmetric) in the rightward-leftward direction of the display cell 11. For example, as illustrated in FIG. 16, it is preferable that the excitation point 17c be disposed at a central position in the rightward-leftward direction of the display cell 11, and a distance D1 from the excitation point 17a to the excitation point 17b and a distance D2 from the excitation point 17b to the excitation point 17c be equal to each other. Moreover, for example, as illustrated in FIG. 15, it is preferable that the bass speaker 61a be disposed on a line CL1 passing through a center of the distance D1 and extending in the upward-downward direction of the display cell 11, and the bass speaker 61b be disposed on a line CL2 passing through a center of the distance D2 and extending in the upward-downward direction of the display cell 11.

Doing so makes it possible to make a distance from the excitation point 17a to the bass speaker 61a and a distance from the excitation point 17c to the bass speaker 61a equal to each other. Moreover, it is possible to make a distance from the excitation point 17c to the bass speaker 61b and a distance from the excitation point 17b to the bass speaker 61b equal to each other. Further, in a case where the excitation points 17a, 17b, and 17c, and the bass speakers 61a and 61b are collectively called vibration sources, it is possible to make distances in a plane between two mutually adjacent vibration sources equal to each other. As a result, it is possible to match phases of all the excitation points 17a, 17b, and 17c, and the bass speakers 61a and 61b. Accordingly, it is possible to improve sound quality.

It is to be noted that FIG. 16 illustrates only one excitation point 17a; however, two excitation points 17a or three or more excitation points 17a may be provided adjacent to one another. Likewise, FIG. 16 illustrates only one excitation point 17b; however, two excitation points 17b or three or more excitation points 17b may be provided adjacent to one another. Likewise, FIG. 16 illustrates only one excitation point 17c; however, two excitation points 17c or three or more excitation points 17c may be provided adjacent to one another.

[Modification Example E]

In the foregoing modification examples C and D, the audio signal processing circuit 37 may further include, for example, the LC signal generator 37G and the RC signal generator 37H, as illustrated in FIG. 17.

The audio signal processing circuit 37 causes the L signal SL and the C signal 30c' to pass through the LC signal generator 37G, thereby generating a signal (the LC signal 30f') to be inputted to the HPF 37B. The LC signal generator 37G generates the LC signal 30f' on the basis of the L signal SL and the C signal 30c'. The audio signal processing circuit 37 causes the LC signal 30f' to pass through the HPF 37B, thereby generating a signal (the LC signal 30f) to be supplied to the exciter 21a. The HPF 37B cuts (or attenuates) a predetermined low range in the LC signal 30f' to generate the LC signal 30f.

The audio signal processing circuit 37 causes the R signal SR and the C signal 30c' to pass through the RC signal generator 37H, thereby generating a signal (the RC signal 30g') to be inputted to the HPF 37C. The RC signal generator 37H generates the RC signal 30g' on the basis of the R signal SR and the C signal 30c'. The audio signal processing circuit 37 causes the RC signal 30g' to pass through the HPF 37C, thereby generating a signal (the RC signal 30g) to be supplied to the exciter 21b. The HPF 37C cuts (or attenuates) a predetermined low range in the RC signal 30g' to generate the RC signal 30g.

The LC signal generator 37G outputs the L signal SL at low volume, and outputs the LC signal 30f' at high volume. The RC signal generator 37H outputs the R signal SR at low volume, and outputs the RC signal 30g' at high volume. Thus, in the present modification example, the L signal 30a and the R signal 30b are supplied to the excitation points 17a and 17b at low volume, and the LC signal 30f and the RC signal 30g corrected with use of the C signal 30c are supplied to the excitation points 17a and 17b at high volume. Accordingly, as compared to a case where the L signal 30a and the R signal 30b are always supplied to the exciters 21a and 21b, it is possible to keep sound pressure balance of LCR channels even at high volume. This makes it possible to improve sound quality.

For example, in place of the panel section 10, a resistor is coupled to the output terminal of the audio device driver 38, and a signal passing through the resistor is analyzed by a signal analyzer, or the like, which makes it possible to specify switching of an output signal in the LC signal generator 37G and the RC signal generator 37H.

[Modification Example F]

In the foregoing first embodiment and the modification examples thereof, the audio signal processing circuit 37 adjusts, for example, a magnitude relationship between output sound pressures Pa and Pb of LR channels and an output sound pression Pc of a C channel in accordance with the size of the display cell 11, as illustrated in FIGS. 18, 19, and 20.

For example, as illustrated in FIG. 18, in a case where the size of the display cell 11 belongs to a relatively small size category, the audio signal processing circuit 37 causes the output sound pressures Pa and Pb of the LR channels to be larger than the output sound pressure Pc of the C channel. Even in the case where the size of the display cell 11 belongs to the relatively small size category, doing so makes it possible for a user to perceive spread of sound, and further makes it possible to optimize ease of hearing of sound of the C-channel.

For example, as illustrated in FIG. 19, in a case where the size of the display cell 11 belongs to a middle-size category, the audio signal processing circuit 37 causes the output sound pressures Pa and Pb of the LR channels to be equal or almost equal to the output sound pressure Pc of the C channel. Even in the case where the size of the display cell 11 belongs to the middle-size category, doing so makes it possible for the user to perceive spread of sound, and further makes it possible to optimize ease of hearing of sound of the C-channel.

For example, as illustrated in FIG. 20, in a case where the size of the display cell 11 belongs to a relatively large-size category, the audio signal processing circuit 37 causes the output sound pressure Pc of the C channels to be larger than the output sound pressures Pa and Pb of the LR channels. Even in the case where the size of the display cell 11 belongs to the relatively large-size category, doing so makes it possible for the user to perceive spread of sound, and further makes it possible to optimize ease of hearing of sound of the C-channel.

It is to be noted that FIGS. 18, 19, and 20 each illustrate only one excitation point 17a; however, two excitation points 17a or three of more excitation points 17a may be provided adjacent to one another. Likewise, FIGS. 18, 19, and 20 each illustrate only one excitation point 17b; however, two excitation points 17b or three or more excitation points 17b may be provided adjacent to one another. Likewise, FIGS. 18, 19, and 20 each illustrate only one excitation point 17c; however, two excitation points 17c or three or more excitation points 17c may be provided adjacent to one another.

3. Second Embodiment

[Configuration]

Description is given of a display apparatus 2 according to a second embodiment of the present disclosure. FIG. 21 illustrates a side configuration example of the display apparatus 2 according to the present embodiment. The display apparatus 2 has a configuration similar to that of the display apparatus 1 according to the foregoing modification example C, except that an exciting section 70 is provided in place of the exciting section 20 and a signal processor 80 is provided in place of the signal processor 30. FIG. 22 illustrates a configuration example of a back surface of the display apparatus 2 in a case where the rear cover 10R of the display apparatus 2 is removed. FIG. 22 exemplifies a circuit substrate 80A corresponding to a specific example of the signal processor 80.

The display apparatus 2 includes, for example, the panel section 10, the exciting section 70, the signal processor 80, the supporting section 40, and the bass speaker section 60.

The exciting section 70 is disposed on the back surface of the panel section 10. The signal processor controls the exciting section 70. The supporting section 40 supports the panel section 10 with the rotating section 50 interposed therebetween. The exciting section 70 and the signal processor 80 are disposed on the back surface of the panel section 10. The panel section 10 includes the rear cover 10R on the back surface of the panel section 10. The rear cover 10R protects the panel section 10, the exciting section 70, and the signal processor 80. In the present embodiment, the panel section 10 has a cross-sectional configuration common to the cross-sectional configuration illustrated in FIG. 4.

The exciting section 70 includes, for example, five exciters 21 (21a, 21b, 21c, 21d, and 21e). The exciters 21a, 21b, 21c, 21d, and 21e have a mutually common configuration.

The exciters 21a and 21d are disposed on the left as the display cell 11 is viewed from the back surface. The exciters 21b and 21e are disposed on the right as the display cell 11 is viewed from the back surface. The exciter 21c is disposed in the middle in the rightward-leftward direction as the display cell 11 is viewed from the back surface. The exciters 21a and 21c are disposed slightly above the middle in the upward-downward direction, for example. The exciters 21d and 21e are disposed slightly below the middle in the upward-downward direction, for example. The exciter 21c is disposed in the middle in the upward-downward direction, for example. The exciters 21a, 21b, 21c, 21d, and 21e each include, for example, a voice coil, a bobbin on which the voice coil is wound, and a magnetic circuit, and each are a speaker actuator serving as a vibration source. In a case where an audio current of an electrical signal passes through the voice coil, each of the exciters 21a, 21b, 21c, 21d, and 21e causes the voice coil to generate a driving force in accordance with the electromagnetic action principle. This driving force is transmitted to the display cell 11 through the vibration transmission member 24 to be described later, which causes the display cell 11 to generate vibrations corresponding to change in the audio current, resulting in vibrations in air and change in a sound pressure.

The exciting section 70 further includes, for example, the fixing section 23 and the vibration transmission member 24 for each of the exciters 21a, 21b, 21c, 21d, and 21e. The fixing section 23 and the vibration transmission member 24 have configurations similar to those in the foregoing first embodiment.

The panel section 10 includes, for example, the damping member 16 between the display cell 11 and the inner plate 12, as illustrated in FIG. 4. The damping member 16 has an action of preventing vibrations generated in the display cell 11 by the respective exciters 21a, 21b, 21c, 21d, and 21e from interfering with one another.

FIG. 23 illustrates a planar configuration example of the damping member 16. Here, in the back surface of the display cell 11, a position opposed to the exciter 21a is referred to as the excitation point 17a, a position opposed to the exciter 21b is referred to as the excitation point 17b, a position opposed to the exciter 21c is referred to as the excitation point 17c, a position opposed to the exciter 21d is referred to as an excitation point 17d, and a position opposed to the exciter 21e is referred to as an excitation point 17e. At this time, the damping member 16 partitions the back surface of the display cell 11 into the partition region 15a including the excitation points 17a and 17d, the partition region 15b including the excitation points 17b and 17e, and the partition region 15c including the excitation point 17c.

The damping member 16 may be configured to dispose each of the excitation points 17a, 17b, 17c, 17d, and 17e (or the exciters 21a, 21b, 21c, 21d, and 21e) at a position out of a center of a corresponding one of the partition regions 15a, 15b, and 15c, for example, as illustrated in FIG. 23. In terms of suppression of a standing wave, each of the excitation points 17a, 17b, 17c, 17d, and 17e (or the exciters 21a, 21b, 21c, 21d, and 12e) is preferably disposed at a position out of the center of the corresponding one of the partition regions 15a, 15b, and 15c. The "centers of the partition regions 15a, 15b, and 15c" respectively indicate, for example, vertically and horizontally central positions of the partition regions 15a, 15b, and 15c in a case where the partition regions 15a, 15b, and 15c each have a rectangular shape as illustrated in FIG. 23. The "centers of the partition regions 15a, 15b, and 15c" respectively indicate, for example, intersections of a central line of a shortest vertical distance and a central line of a shortest horizontal distance in the partition regions 15a, 15b, and 15c, in a case where the partition regions 15a, 15b, and 15c are surrounded by the damping member 16.

FIG. 24 illustrates a functional block example of the signal processor 80. FIG. 25 illustrates a functional block example of an audio signal processing circuit 87. It is to be noted that a D/A converter is omitted in FIG. 25. The audio signal processing circuit 87 performs, for example, predetermined processing on audio data (the L signal SL and the R signal SR) obtained by the decoder 33, and performs processing such as D/A conversion. The audio signal processing circuit 87 generates, for example, a signal (for example, an L1 signal 80a) to be supplied to the exciter 21a, a signal (for example, an L2 signal 80d) to be supplied to the exciter 21d, a signal (for example, an R1 signal 80b) to be supplied to the exciter 21b, a signal (for example, an R2 signal 80e) to be supplied to the exciter 21e, a signal (for example, a C signal 80c) to be supplied to the exciter 21c, a signal (for example, an LW signal 80f) to be supplied to the bass speaker 61a, and a signal (for example, an RW signal 80g) to be supplied to the bass speaker 61b. The audio device driver 38 amplifies, for example, various kinds of audio signals outputted from the audio signal processing circuit 87 and supplies the thus-amplified audio signals to the exciting section 70 and the bass speaker section 60, thereby driving the exciting section 70 and the bass speaker section 60.

The audio signal processing circuit 87 causes the L signal SL to pass through an L1L2 signal generator 87A, thereby generating two signals (an L1 signal 80a' and an L2 signal 80d'). The L1L2 signal generator 87A performs predetermined processing on the L signal SL to generate two signals (the L1 signal 80a' and the L2 signal 80d'). The audio signal processing circuit 87 further causes the R signal SR to pass through an R1R2 signal generator 87B, thereby generating two signals (an R1 signal 80b' and an R2 signal 80e'). The R1R2 signal generator 87B performs predetermined processing on the R signal SR to generate two signals (the R1 signal 80b' and the R2 signal 80e').

The audio signal processing circuit 87 causes the L1 signal 80a' to pass through an HPF 87D, thereby generating the L1 signal 80a in which a predetermined low range is cut (or attenuated). The HPF 87D cuts (or attenuates) the predetermined low range in the L1 signal 80a' to generate the L1 signal 80a. The audio signal processing circuit 87 causes the L2 signal 80d' to pass through an HPF 87E, thereby generating the L2 signal 80d in which a predetermined low range is cut (or attenuated). The HPF 87E cuts (or attenuates) the predetermined low range in the L2 signal 80d' to generate the L2 signal 80d.

The audio signal processing circuit 87 causes the R1 signal 80b' to pass through an HPF 87F, thereby generating the R1 signal 80*b* in which a predetermined low range is cut (or attenuated). The HPF 87F cuts (or attenuates) the predetermined low range in the R1 signal 80*b*' to generate the R1 signal 80*b*. The audio signal processing circuit 87 causes the R2 signal 80*e*' to pass through an HPF 87G, thereby generating the R2 signal 80*e* in which a predetermined low range is cut (or attenuated). The HPF 87G cuts (or attenuates) the predetermined low range in the R2 signal 80*e*' to generate the R2 signal 80*e*.

The audio signal processing circuit 87 causes the L signal SL and the R signal SR to pass through a C signal generator 87C, thereby generating the C signal 80*c*' based on the L signal SL and the R signal SR. The C signal generator 87C generates the C signal 80*c*' on the basis of the L signal SL and the R signal SR. The audio signal processing circuit 87 causes the C signal 80*c*' to pass through an HPF 87H, thereby generating the C signal 80*c* in which a predetermined low range is cut (or attenuated). The HPF 87H cuts (or attenuates) the predetermined low range in the C signal 80*c*' to generate the C signal 80*c*.

The audio signal processing circuit 87 causes the L1 signal 80*a*', the L2 signal 80*d*', and the C signal 80*c*' to pass through an LW signal generator 87I, thereby generating the LW signal 80*f*. The LW signal generator 87I generates the LW signal 80*f* on the basis of the L1 signal 80*a*', the L2 signal 80*d*', and the C signal 80*c*'. The audio signal processing circuit 87 causes the R1 signal 80*b*', the R2 signal 80*e*', and the C signal 80*c*' to pass through an RW signal generator 87J, thereby generating the RW signal 80*g*. The RW signal generator 87J generates the RW signal 80*g* on the basis of the R1 signal 80*b*', the R2 signal 80*e*', and the C signal 80*c*'. In other words, the display apparatus 2 according to the present embodiment serves as a 5.2-ch sound system.

In the present embodiment, cutoff frequencies in the HPFs 87D, 87E, 87F, 87G, and 87H become f1 at low volume, and become f2 (>f1) at high volume. By doing so, signals in the low sound range included in the L signal SL and the R signal SR are cut (or attenuated) at high volume. As a result, it is possible to suppress generation of screen shaking in the display cell 11 by the signals in the low sound range included in the L signal SL and the R signal SR.

It is to be noted that in the present embodiment, the audio signal processing circuit 87 may change the cutoff frequencies in the HPFs 87D, 87E, 87F, 87G and 87H in accordance with a volume level. For example, the audio signal processing circuit 87 may increase the cutoff frequencies in the HPFs 87D, 87F, 87G, and 87H with an increase in the volume level. Doing so makes it possible to effectively suppress generation of screen shaking in the display cell 11 by the signals in the low sound range included in the L signal SL and the R signal SR.

Moreover, in the present embodiment, signals (the LW signal 80*f* and the RW signal 80*g*) obtained by correcting the L1 signal 80*a*', the L2 signal 80*d*', the R1 signal 80*b*', and the R2 signal 80*e*' with use of the C signal 80*c* are supplied to the bass speaker section 60. This makes it possible to supply, to the bass speaker section 60, an audio signal having a woofer characteristic suitable for characteristics of the exciters 21*a*, 21*b*, 21*c*, 21*d*, and 21*e*. Accordingly, it is possible to improve sound quality in the low sound range.

In the present embodiment, positions of the excitation points 17*a*, 17*b*, 17*c*, 17*d*, and 17*e* and the bass speaker 61*a* and 61*b* are preferably symmetric (bilaterally symmetric) in the rightward-leftward direction of the display cell 11. Here, in a case where the excitation points 17*a*, 17*b*, 17*c*, 17*d*, and 17*e*, and the bass speakers 61*a* and 61*b* are collectively called vibration sources, distances in a plane between two mutually adjacent vibration sources are preferably equal to one another. For example, as illustrated in FIG. 26, in a case where the excitation point 17*c* is disposed at a central position in the rightward-leftward direction of the display cell 11, and the excitation points 17*a*, 17*b*, 17*c*, 17*d*, and 17*e*, and the bass speakers 61*a* and 61*b* are collectively called vibration sources, distances (Da, Db, Dc, Dd, De, Df, Dg, and Dh) in the plane between two mutually adjacent vibration sources are preferably equal to one another.

It is to be noted that the distance Da indicates a distance in the plane from the excitation point 17*c* to the bass speaker 61*a*. The distance Db indicates a distance in the plane from the bass speaker 61*a* to the excitation point 17*a*. The distance Dc indicates a distance in the plane from the bass speaker 61*a* to the excitation point 17*d*. The distance Dd indicates a distance in the plane from the excitation point 17*a* to the excitation point 17*d*. The distance De indicates a distance in the plane from the excitation point 17*c* to the bass speaker 61*b*. The distance Df indicates a distance in the plane from the bass speaker 61*b* to the excitation point 17*b*. The distance Dg indicates a distance in the plane from the bass speaker 61*b* to the excitation point 17*e*. The distance Dh indicates a distance in the plane from the excitation point 17*b* to the excitation point 17*e*.

Doing so makes it possible to match phases of all the excitation points 17*a*, 17*b*, 17*c*, 17*d*, and 17*e* and the bass speakers 61*a* and 61*b*. Accordingly, it is possible to improve sound quality.

It is to be noted that FIG. 26 illustrates only one excitation point 17*a*; however, two excitation points 17*a* or three or more excitation points 17*a* may be provided adjacent to one another. Likewise, FIG. 26 illustrates only one excitation point 17*b*; however, two excitation points 17*b* or three or more excitation points 17*b* may be provided adjacent to one another. Likewise, FIG. 26 illustrates only one excitation point 17*c*; however, two excitation points 17*c* or three or more excitation points 17*c* may be provided adjacent to one another. Likewise, FIG. 26 illustrates only one excitation point 17*d*; however, two excitation points 17*d* or three or more excitation points 17*d* may be provided adjacent to one another. Likewise, FIG. 26 illustrates only one excitation point 17*e*; however, two excitation points 17*e* or three or more excitation points 17*e* may be provided adjacent to one another.

Moreover, in the present embodiment, the audio signal processing circuit 87 may further include, for example, an L1C signal generator 87K, an L2C signal generator 87L, an R1C signal generator 87M, and an R2C signal generator 87N, as illustrated in FIG. 27.

The audio signal processing circuit 87 causes the L1 signal 80*a*' and the C signal 80*c*' to pass through the L1C signal generator 87K, thereby generating a signal (an L1C signal 80*h*') to be inputted to the HPF 87D. The L1C signal generator 87K generates the L1C signal 80*h*' on the basis of the L1 signal 80*a*' and the C signal 80*c*'. The audio signal processing circuit 87 causes the L2 signal 80*d*' and the C signal 80*c*' to pass through the L2C signal generator 87L, thereby generating a signal (an L2C signal 80*i*') to be inputted to the HPF 87E. The L2C signal generator 87L generates the L2C signal 80*i*' on the basis of the L2 signal 80*d*' and the C signal 80*c*'. The audio signal processing circuit 87 causes the R1 signal 80*b*' and the C signal 80*c*' to pass through the R1C signal generator 87M, thereby generating a signal (an R1C signal 80*j*') to be inputted to the HPF 87F. The LC signal generator 87M generates the R1C signal 80*j*' on the basis of the R1 signal 80*b*' and the C signal 80*c*'. The audio signal processing circuit 87 causes the R2 signal 80e' and the C signal 80c' to pass through the R2C signal generator 87N, thereby generating a signal (an R2C signal 80k') to be inputted to the HPF 87G. The LC signal generator 87N generates the R2C signal 80k' on the basis of the R2 signal 80e' and the C signal 80c'.

The L1C signal generator 87K outputs the L1 signal 80a' at low volume, and outputs the L1C signal 80h' at high volume. The L2C signal generator 87L outputs the L1 signal 80d' at low volume, and outputs the L1C signal 80i' at high volume. The R1C signal generator 87M outputs the R1 signal 80b' at low volume, and outputs the R1C signal 80j' at high volume. The R2C signal generator 87N outputs the R2 signal 80e' at low volume, and outputs the R2C signal 80k' at high volume. Thus, in the present modification example, the L1 signal 80a, the L2 signal 80d, the R1 signal 80b, and the R2 signal 80e are supplied to the excitation points 17a, 17b, 17d, and 17e at low volume, and the L1C signal 80h, the L2C signal 80i, the R1C signal 80j, and the R2C signal 80k corrected with use of the C signal 30c are supplied to the excitation points 17a, 17b, 17d, and 17e at high volume. Accordingly, as compared to a case where the L1 signal 80a, the L2 signal 80d, the R1 signal 80b, and the R2 signal 80e are always supplied to the exciters 21a, 21b, 21d, and 21e, it is possible to keep sound pressure balance of LCR channels even at high volume. This makes it possible to improve sound quality.

For example, in place of the panel section 10, a resistor is coupled to the output terminal of the audio device driver 38, and a signal passing through the resistor is analyzed by a signal analyzer, or the like, which makes it possible to specify switching of an output signal in the L1C signal generator 87K, the L2C signal generator 87L, the R1C signal generator 87M, and the R2C signal generator 87N.

4. Modification Example Common to Foregoing Respective Embodiments

Next, description is given of a modification example common to the display apparatuses 1 and 2 according to the foregoing embodiments and the modification examples thereof.

Description is given of a case where the display apparatus 1 according to any of the foregoing first embodiment and the modification examples thereof is used as one of speakers in a 5.1-ch sound system. For example, the display apparatus 1 according to any of the foregoing first embodiment and the modification examples thereof includes an input port 1A for an audio signal from an external amplifier 160, as illustrated in FIG. 28. For example, an audio signal of the C channel is inputted to the input port 1A. The input port 1A is coupled to the audio signal processing circuit 37 of the signal processor 30, for example, as illustrated in FIG. 29. The audio signal processing circuit 37 outputs a signal (for example, the audio signal of the C channel) inputted to the input port 1A to, for example, the exciters 21a, 21b, and 21c, and the bass speakers 61a and 61b.

A sound system 100 includes an R speaker 110, an L speaker 120, an SR speaker 130, an SL speaker 140, an SWF speaker 150, the display apparatus 1 according to any of the foregoing first embodiment and the modification examples thereof, and an amplifier 160. In the sound system 100, inputting an audio signal from the amplifier 160 to the input port 1A makes it possible for the display apparatus 1 to serve as a C-channel speaker, for example.

It is to be noted that FIG. 28 illustrates only one exciter 21a; however, two exciters 21a or three or more exciters 21a may be provided adjacent to one another. Likewise, FIG. 28 illustrates only one exciter 21b; however, two exciters 21b or three or more exciters 21b may be provided adjacent to one another. Likewise, FIG. 28 illustrates only one exciter 21c; however, two exciters 21c or three or more exciters 21c may be provided adjacent to one another.

Next, description is given of a case where the display apparatus 2 according to any of the foregoing second embodiment and modification examples thereof is used as one of speakers in a 5.1-ch sound system. For example, the display apparatus 2 according to any of the foregoing second embodiment and the modification examples thereof includes the input port 1A for the audio signal from the external amplifier 160, as illustrated in FIG. 30. For example, an audio signal of the C channel is inputted to the input port 1A. The input port 1A is coupled to the audio signal processing circuit 87 of the signal processor 80, for example, as illustrated in FIG. 31. The audio signal processing circuit 87 outputs a signal (for example, the audio signal of the C channel) inputted to the input port 1A to, for example, the exciters 21a, 21b, 21c, 21d, and 21e, and the bass speakers 61a and 61b.

The sound system 100 includes the R speaker 110, the L speaker 120, the SR speaker 130, the SL speaker 140, the SWF speaker 150, the display apparatus 2 according to any of the foregoing second embodiment and the modification examples thereof, and the amplifier 160. In the sound system 100, inputting an audio signal from the amplifier 160 to the input port 1A makes it possible for the display apparatus 2 to serve as a C-channel speaker, for example.

It is to be noted that FIG. 30 illustrates only one exciter 21a; however, two exciters 21a or three or more exciters 21a may be provided adjacent to one another. Likewise, FIG. 30 illustrates only one exciter 21b; however, two exciters 21b or three or more exciters 21b may be provided adjacent to one another. Likewise, FIG. 30 illustrates only one exciter 21c; however, two exciters 21c or three or more exciters 21c may be provided adjacent to one another. Likewise, FIG. 30 illustrates only one exciter 21d; however, two exciters 21d or three or more exciters 21d may be provided adjacent to one another. Likewise, FIG. 30 illustrates only one exciter 21e; however, two or more exciters 21e or three or more exciters 21e may be provided adjacent to one another.

In the foregoing first and second embodiments and the modification examples thereof, for example, the supporting section 40 and the rotating section 50 may be omitted, as illustrated in FIGS. 32 and 33. However, in this case, the rear cover 10R preferably has a depression 30B for hanging of any if the display apparatuses 1 and 2 according to the foregoing first and second embodiments and the modification examples thereof on a hook provided on a wall or the like. It is to be noted that in a case where any of the display apparatuses 1 and 2 according to the foregoing first and second embodiments and the modification examples thereof is placed on a table top stand, it is sufficient if the depression 30B described above is not provided.

In the foregoing first and second embodiments and the modification examples thereof, the display apparatuses 1 and 2 may serve as a 7.3-ch sound system.

Although the present disclosure has been described with reference to the embodiments and the modification examples thereof, the present disclosure is not limited to the foregoing embodiments, etc., and may be modified in a variety of ways. It is to be noted that effects described in the description are merely examples. Effects of the present disclosure are not limited to the effects described in the description. The present disclosure may have effects other than the effects described in the description.

Moreover, for example, the present disclosure may have the following configurations.

(1)

A display apparatus including:

a thin plate-like display cell that displays an image;

M exciters that are disposed on a back surface side of the display cell, and vibrate the display cell; and a driving section that drives the display cell and the M exciters, in which a thin plate-like display cell that displays an image;

M exciters that are disposed on a back surface side of the display cell, and vibrate the display cell; and a driving section that drives the display cell and the M exciters, wherein the driving section generates M kinds of first audio signals on a basis of an audio signal obtained from an external signal, generates, on a basis of M−O combinations, which are different from one another, of K kinds of the first audio signals selected from the M kinds of the first audio signals (where 2≤K<M and 1≤O<M−1), a second audio signal for each of the M−O combinations, and supplies, to the M exciters, M−O kinds of the second audio signals and a third audio signal that is one of the M kinds of the first audio signals.

(2)

The display apparatus according to (1), in which the driving section supplies the M−O kinds of the second audio signals and the third audio signal to the M exciters at high volume.

(3)

The display apparatus according to (2), in which the driving section supplies the M kinds of the first audio signals to the M exciters at low volume.

(4)

The display apparatus according to (1), in which the driving section supplies, to M−O of the exciters, M−O kinds of fourth audio signals generated by attenuating a predetermined low range in each of the second audio signals, and supplies a fifth audio signal generated by attenuating a predetermined low range in the third audio signal to the exciters to which the fourth audio signal is not supplied of the M exciters.

(5)

The display apparatus according to any one of (1) to (4), further a plurality of bass speakers, in which in a case where the M kinds of the exciters and the plurality of bass speakers are collectively called vibration sources, distances in a plane between two mutually adjacent vibration sources are equal to one another.

(6)

The display apparatus according to any one of (1) to (5), further including N bass speakers, in which the driving section generates, on a basis of N combinations, which are different from one another, of J kinds (2≤J≤N) of the second audio signals selected from M−O kinds of the second audio signals as well as the third audio signal, a sixth audio signal for each of the N combinations, and supplies N kinds of the sixth audio signals to the N bass speakers.

(7)

The display apparatus according to (1), in which the M exciters include a left exciter, a middle exciter, and a right exciter, the M kinds of the first audio signals include a first left audio signal, a first middle audio signal, and a first right audio signal, the M−O kinds of the second audio signals include a second left audio signal and a second right audio signal, and the driving section generates the first left audio signal, the first middle audio signal, and the first right audio signal on the basis of the audio signal, generates the second left audio signal on the basis of the first left audio signal and the first middle audio signal, and generates the second right audio signal on the basis of the first right audio signal and the first middle audio signal, and the driving section supplies the second left audio signal to the left exciter, supplies the first middle audio signal to the middle exciter, and supplies the second right audio signal to the right exciter.

(8)

The display apparatus according to (7), in which at high volume, the driving section supplies the second left audio signal to the left exciter and supplies the second right audio signal to the right exciter.

(9)

The display apparatus according to (7), in which at low volume, the driving section supplies the first left audio signal to the left exciter, supplies the first middle audio signal to the middle exciter, and supplies the first right audio signal to the right exciter.

(10)

The display apparatus according to (1), in which the M exciters include a first top-left exciter, a first bottom-left exciter, a middle exciter, a first top-right exciter, and a second bottom-right exciter, the M kinds of the first audio signals include a first top-left audio signal, a first bottom-left audio signal, a first middle audio signal, a first top-right audio signal, and a first bottom-right audio signal, M−1 kinds of the second audio signals include a second top-left audio signal, a second bottom-left audio signal, a second top-right audio signal, and a second bottom-right audio signal, and the driving section generates the first top-left audio signal, the first bottom-left audio signal, the first middle audio signal, the first top-right audio signal, and the bottom-right audio signal on the basis of the audio signal, generates the second top-left audio signal on the basis of the first top-left audio signal and the first middle audio signal, generates the second bottom-left audio signal on the basis of the first bottom-left audio signal and the first middle audio signal, generates the second top-right audio signal on the basis of the first top-right audio signal and the first middle audio signal, and generates the second bottom-right audio signal on the basis of the first bottom-right audio signal and the first middle audio signal, and the driving section supplies the second top-left audio signal to the top-left exciter, supplies the second bottom-left audio signal to the bottom-left exciter, supplies the first middle audio signal to the middle exciter, supplies the second top-right audio signal to the top-right exciter, and supplies the second bottom-right audio signal to the bottom-right exciter.

(11)

The display apparatus according to (10), in which at high volume, the driving section supplies the second top-left audio signal to the top-left exciter, supplies the second bottom-left audio signal to the bottom-left exciter, the second top-right audio signal to the top-right exciter, and supplies the second bottom-right audio signal to the bottom-right exciter.

(12)

The display apparatus according to (10), in which at low volume, the driving section supplies the first top-left audio signal to the top-left exciter, supplies the first bottom-left audio signal to the bottom-left exciter, supplies the first top-right audio signal to the top-right exciter, and supplies the first bottom-right audio signal to the bottom-right exciter.

(13)

A signal generation apparatus including a signal processor that generates a signal to be supplied to M exciters on the basis of an audio signal obtained from an external signal, in which the signal processor generates M kinds of first audio signals on the basis of the audio signal, and generates, on the basis of M–O combinations, which are different from one another, of K kinds of the first audio signals selected from the M kinds of the first audio signals (where $2 \leq K < M$ and $1 \leq O < M-1$), a second audio signal for each of the M–O combinations, and supplies, to the M exciters, M–O kinds of the second audio signals and a third audio signal that is one of the M kinds of the first audio signals.

According to the display apparatus and the signal generation apparatus according to the embodiments of the present disclosure, the second audio signals for the respective combinations are generated on the basis of the M–O combinations, which are different from one another, of the K kinds of the first audio signals selected from the M kinds of the first audio signals (where $2 \leq K < M$ and $1 \leq O < M-1$), which makes it possible to keep sound pressure balance of LCR channels even at high volume. Accordingly, it is possible to further improve sound quality. It is to be noted that effects of the present technology are not necessarily limited to effects described herein, and may include any of effects described in the description.

This application claims the benefit of Japanese Priority Patent Application JP2017-254119 filed with the Japan Patent Office on Dec. 28, 2017 and Japanese Priority Patent Application JP2018-174059 filed with the Japan Patent Office on Sep. 18, 2018, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A display apparatus comprising:
a thin plate-like display cell that displays an image;
M exciters that are disposed on a back surface side of the display cell, and vibrate the display cell; and
a driving section that drives the display cell and the M exciters, wherein
the driving section generates M kinds of first audio signals on a basis of an audio signal obtained from an external signal, generates, on a basis of M–O combinations, which are different from one another, of K kinds of the first audio signals selected from the M kinds of the first audio signals (where $2 \leq K < M$ and $1 \leq O < M-1$), a second audio signal for each of the M–O combinations, and supplies to the M exciters, based on a volume level, M–O kinds of the second audio signals and a third audio signal that is one of the M kinds of the first audio signals.

2. The display apparatus according to claim 1, wherein the driving section supplies the M–O kinds of the second audio signals and the third audio signal to the M exciters at high volume.

3. The display apparatus according to claim 2, wherein the driving section supplies the M kinds of the first audio signals to the M exciters at low volume.

4. The display apparatus according to claim 1, wherein the driving section supplies, to M–O of the exciters, M–O kinds of fourth audio signals generated by attenuating a predetermined low range in each of the second audio signals, and supplies a fifth audio signal generated by attenuating a predetermined low range in the third audio signal to the exciters to which the fourth audio signal is not supplied of the M exciters.

5. The display apparatus according to claim 1, further comprising a plurality of bass speakers, wherein
in a case where the M kinds of the exciters and the plurality of bass speakers are collectively called vibration sources, distances in a plane between two mutually adjacent vibration sources are equal to one another.

6. The display apparatus according to claim 1, further comprising N bass speakers, wherein
the driving section generates, on a basis of N combinations, which are different from one another, of J kinds ($2 \leq J \leq N$) of the second audio signals selected from M–O kinds of the second audio signals as well as the third audio signal, a sixth audio signal for each of the N combinations, and supplies N kinds of the sixth audio signals to the N bass speakers.

7. The display apparatus according to claim 1, wherein
the M exciters include a left exciter, a middle exciter, and a right exciter,
the M kinds of the first audio signals include a first left audio signal, a first middle audio signal, and a first right audio signal,
the M–O kinds of the second audio signals include a second left audio signal and a second right audio signal, and
the driving section generates the first left audio signal, the first middle audio signal, and the first right audio signal on a basis of the audio signal, generates the second left audio signal on a basis of the first left audio signal and the first middle audio signal, and generates the second right audio signal on a basis of the first right audio signal and the first middle audio signal, and the driving section supplies the second left audio signal to the left exciter, supplies the first middle audio signal to the middle exciter, and supplies the second right audio signal to the right exciter.

8. The display apparatus according to claim 7, wherein at high volume, the driving section supplies the second left audio signal to the left exciter and supplies the second right audio signal to the right exciter.

9. The display apparatus according to claim 7, wherein at low volume, the driving section supplies the first left audio signal to the left exciter, supplies the first middle audio signal to the middle exciter, and supplies the first right audio signal to the right exciter.

10. The display apparatus according to claim 1, wherein
the M exciters include a first top-left exciter, a first bottom-left exciter, a middle exciter, a first top-right exciter, and a second bottom-right exciter,
the M kinds of the first audio signals include a first top-left audio signal, a first bottom-left audio signal, a first middle audio signal, a first top-right audio signal, and a first bottom-right audio signal,
M–1 kinds of the second audio signals include a second top-left audio signal, a second bottom-left audio signal, a second top-right audio signal, and a second bottom-right audio signal, and
the driving section generates the first top-left audio signal, the first bottom-left audio signal, the first middle audio signal, the first top-right audio signal, and the bottom-right audio signal on a basis of the audio signal, generates the second top-left audio signal on a basis of the first top-left audio signal and the first middle audio signal, generates the second bottom-left audio signal on a basis of the first bottom-left audio signal and the first middle audio signal, generates the second top-right audio signal on a basis of the first top-right audio signal and the first middle audio signal, and generates the second bottom-right audio signal on a basis of the first bottom-right audio signal and the first middle audio signal, and the driving section supplies the second top-left audio signal to the top-left exciter, supplies the second bottom-left audio signal to the bottom-left exciter, supplies the first middle audio signal to the middle exciter, supplies the second top-right audio signal to the top-right exciter, and supplies the second bottom-right audio signal to the bottom-right exciter.

11. The display apparatus according to claim 10, wherein at high volume, the driving section supplies the second top-left audio signal to the top-left exciter, supplies the second bottom-left audio signal to the bottom-left exciter, the second top-right audio signal to the top-right exciter, and supplies the second bottom-right audio signal to the bottom-right exciter.

12. The display apparatus according to claim 10, wherein at low volume, the driving section supplies the first top-left audio signal to the top-left exciter, supplies the first bottom-left audio signal to the bottom-left exciter, supplies the first top-right audio signal to the top-right exciter, and supplies the first bottom-right audio signal to the bottom-right exciter.

13. A signal generation apparatus comprising a signal processor that generates a signal to be supplied to M exciters on a basis of an audio signal obtained from an external signal, wherein the signal processor generates M kinds of first audio signals on a basis of the audio signal, and generates, on a basis of M−O combinations, which are different from one another, of K kinds of the first audio signals selected from the M kinds of the first audio signals (where $2 \leq K < M$ and $1 \leq O < M-1$), a second audio signal for each of the M−O combinations, and supplies to the M exciters, based on a volume level, M−O kinds of the second audio signals and a third audio signal that is one of the M kinds of the first audio signals.

* * * * *